United States Patent [19]

Zur

[11] Patent Number: 5,289,214
[45] Date of Patent: * Feb. 22, 1994

[54] APPARATUS FOR INFORMATION TRANSFER INCLUDING A DIELECTRIC ELEMENT AND GENERALLY NON-IMAGEWISE CHARGE SERVICE

[75] Inventor: Albert Zur, Givat Savion, Israel

[73] Assignee: Cubital Ltd., Herzlia, Israel

[*] Notice: The portion of the term of this patent subsequent to Oct. 20, 2009 has been disclaimed.

[21] Appl. No.: 766,691

[22] Filed: Sep. 27, 1991

Related U.S. Application Data

[63] Continuation-in-part of Ser. No. 697,166, May 8, 1991.

[51] Int. Cl.⁵ .............................................. G01D 15/06
[52] U.S. Cl. .................................. 346/153.1; 346/159
[58] Field of Search ................. 346/1.1, 153.1, 154, 346/155, 159

[56] References Cited

U.S. PATENT DOCUMENTS

| | | | |
|---|---|---|---|
| 3,055,006 | 9/1962 | Dreyfoos, Jr. et al. | 346/153.1 |
| 3,719,481 | 3/1973 | Makino et al. | 346/160 |
| 4,087,826 | 5/1978 | Haeberle | 346/155 |
| 4,345,012 | 8/1982 | Hirsh et al. | 430/48 |
| 4,448,867 | 5/1984 | Ohkubo et al. | 430/31 |
| 4,463,363 | 7/1984 | Gundlach et al. | 346/159 |
| 4,489,278 | 12/1984 | Sawazaki | 324/457 |
| 4,526,848 | 7/1985 | Okada et al. | 430/55 |
| 4,618,249 | 10/1986 | Minor | 355/221 |
| 4,636,815 | 1/1987 | Yuasa | 346/153.1 |
| 4,743,926 | 5/1988 | Schmidlin et al. | 346/159 |
| 4,748,464 | 5/1988 | Pannekoek et al. | 346/155 |
| 4,766,447 | 8/1988 | Tsukada | 346/150 |
| 4,792,860 | 12/1988 | Kuehrle | 346/155 X |
| 4,879,577 | 11/1989 | Mabrouk et al. | 355/208 |
| 4,903,049 | 2/1990 | Sotack | 346/159 |
| 4,961,154 | 10/1990 | Pomerantz et al. | 364/522 |
| 5,043,765 | 8/1991 | Nagashima | 355/208 |
| 5,157,423 | 10/1992 | Zur | 346/159 |

OTHER PUBLICATIONS

R. M. Schaffert, "Electrophotography", 2nd Ed., Focal Press, London, 1975, pp. 166-176.

*Primary Examiner*—Benjamin R. Fuller
*Assistant Examiner*—Randy W. Gibson
*Attorney, Agent, or Firm*—Townsend and Townsend Khourie and Crew

[57] ABSTRACT

Apparatus for information transfer and including a dielectric element having generally opposite first and second surfaces, an information bearing voltage pattern being associated with the first surface and an information bearing charge pattern being associated with the second surface, means for applying a flow of charges to the second surface, the flow of charges being operative to transfer information between the first and second surfaces.

36 Claims, 19 Drawing Sheets

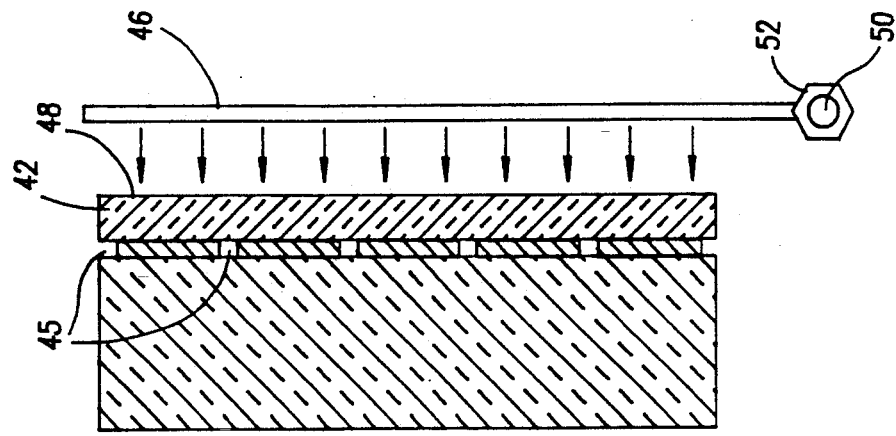
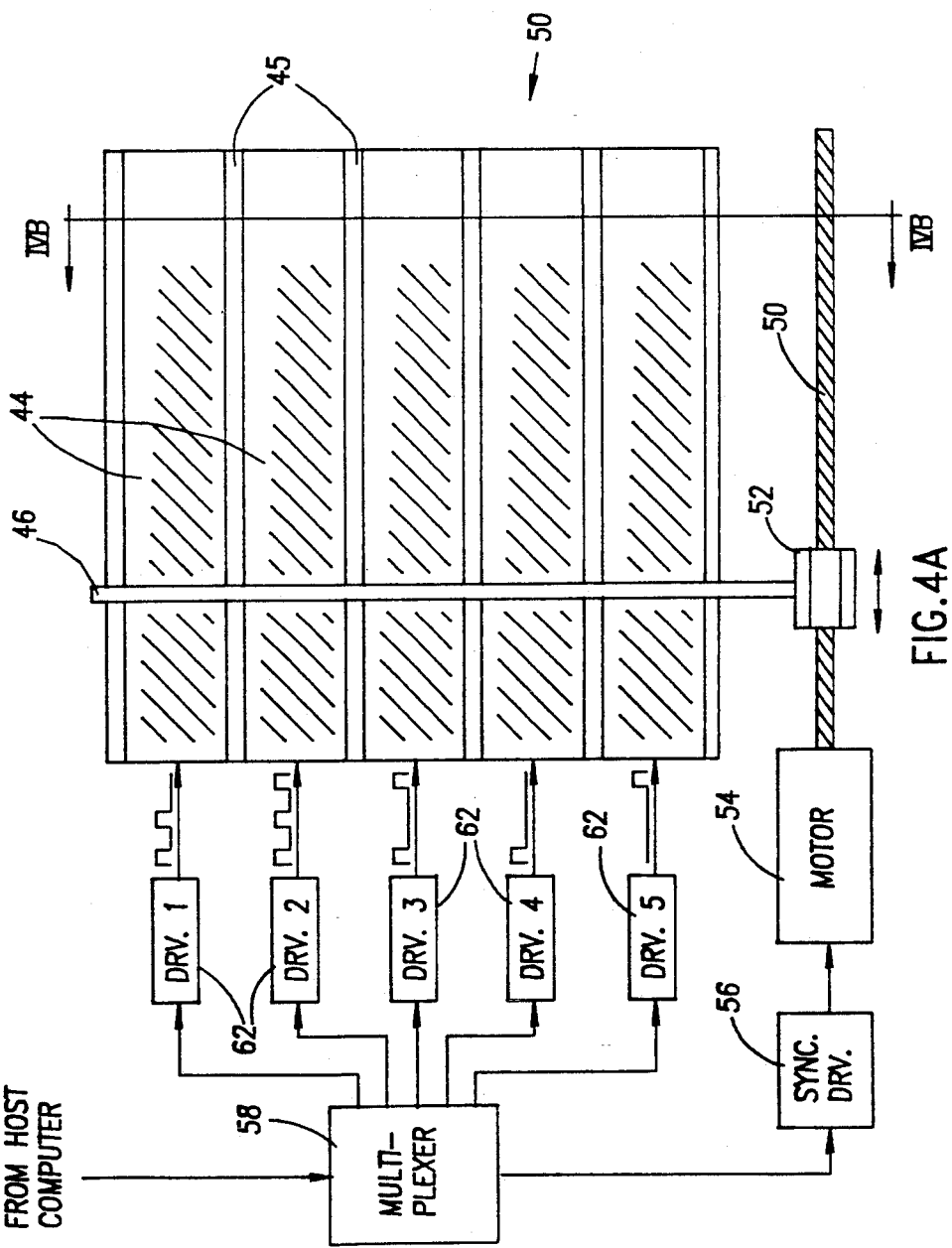

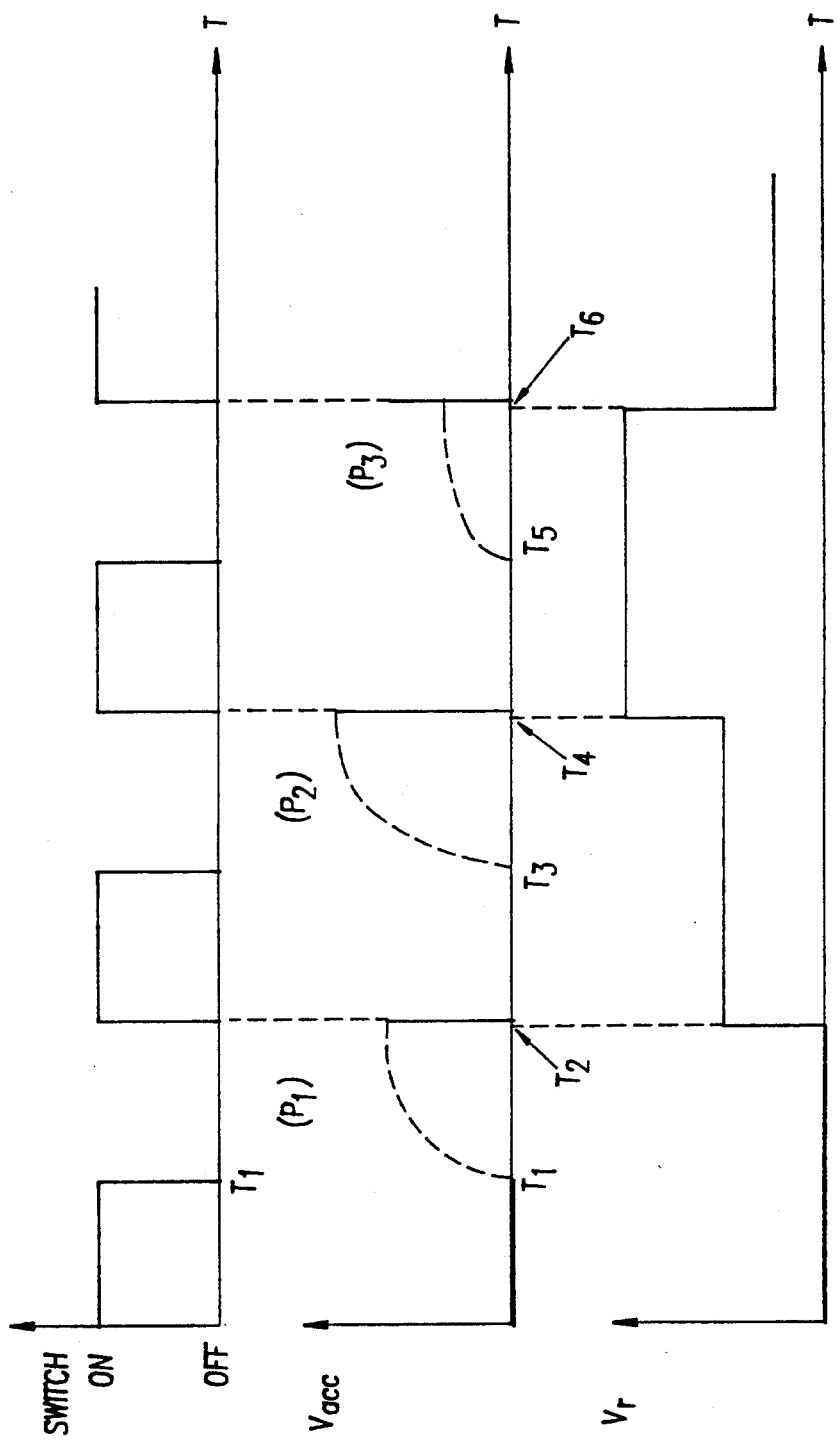

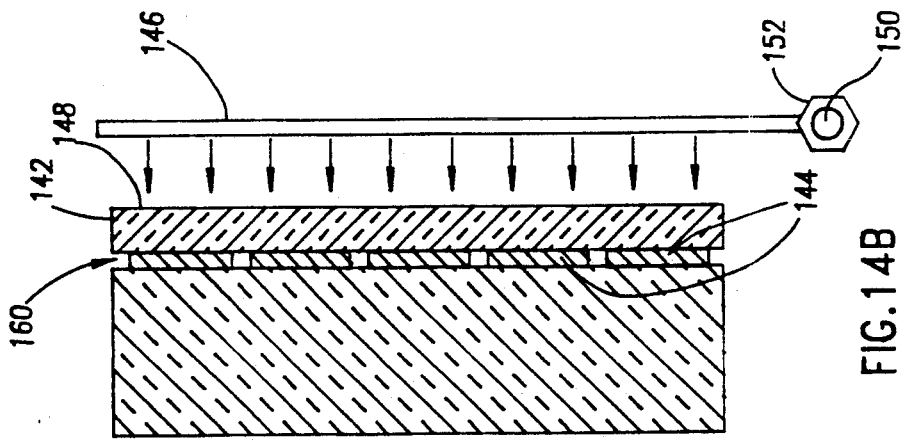
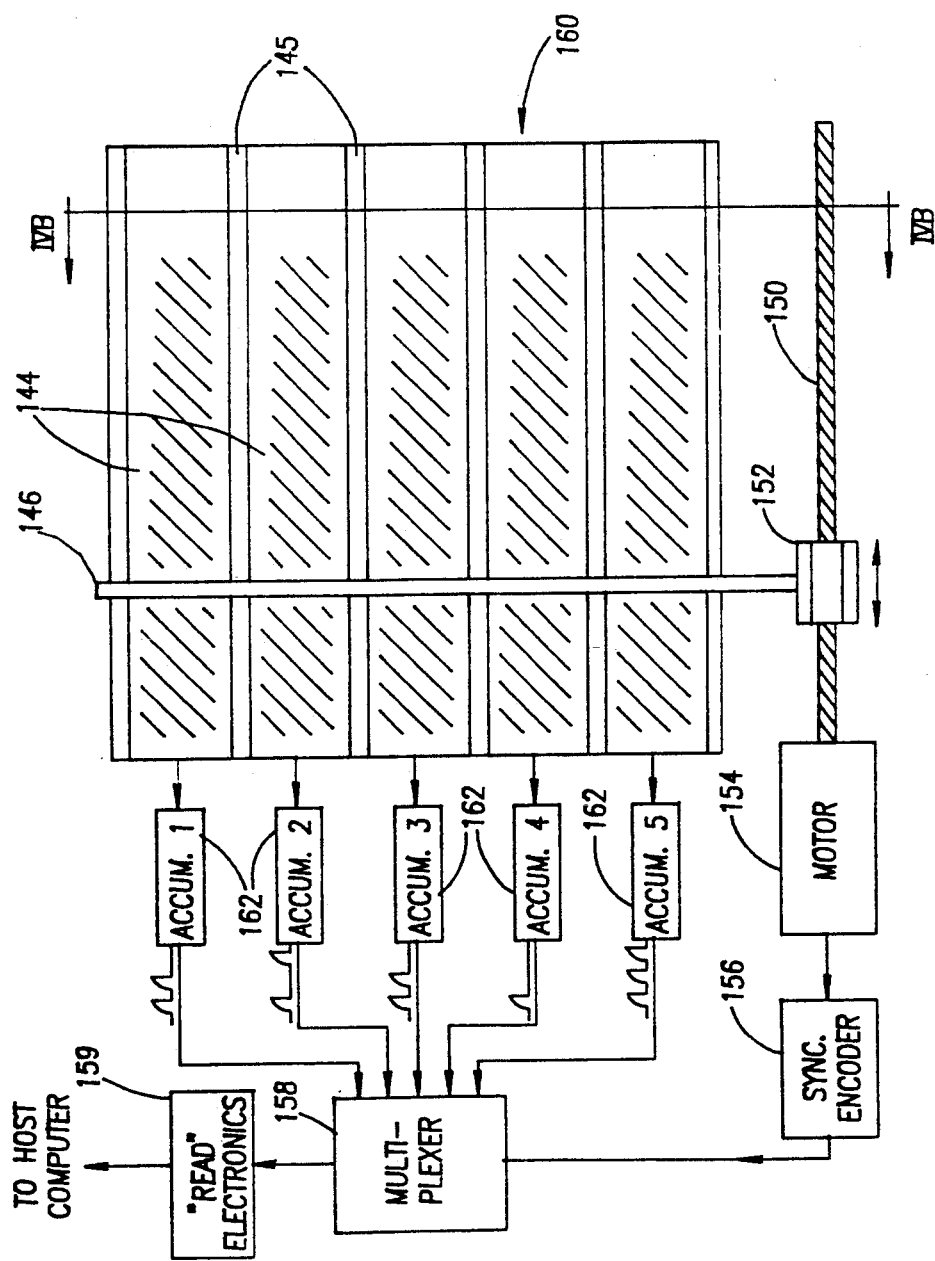

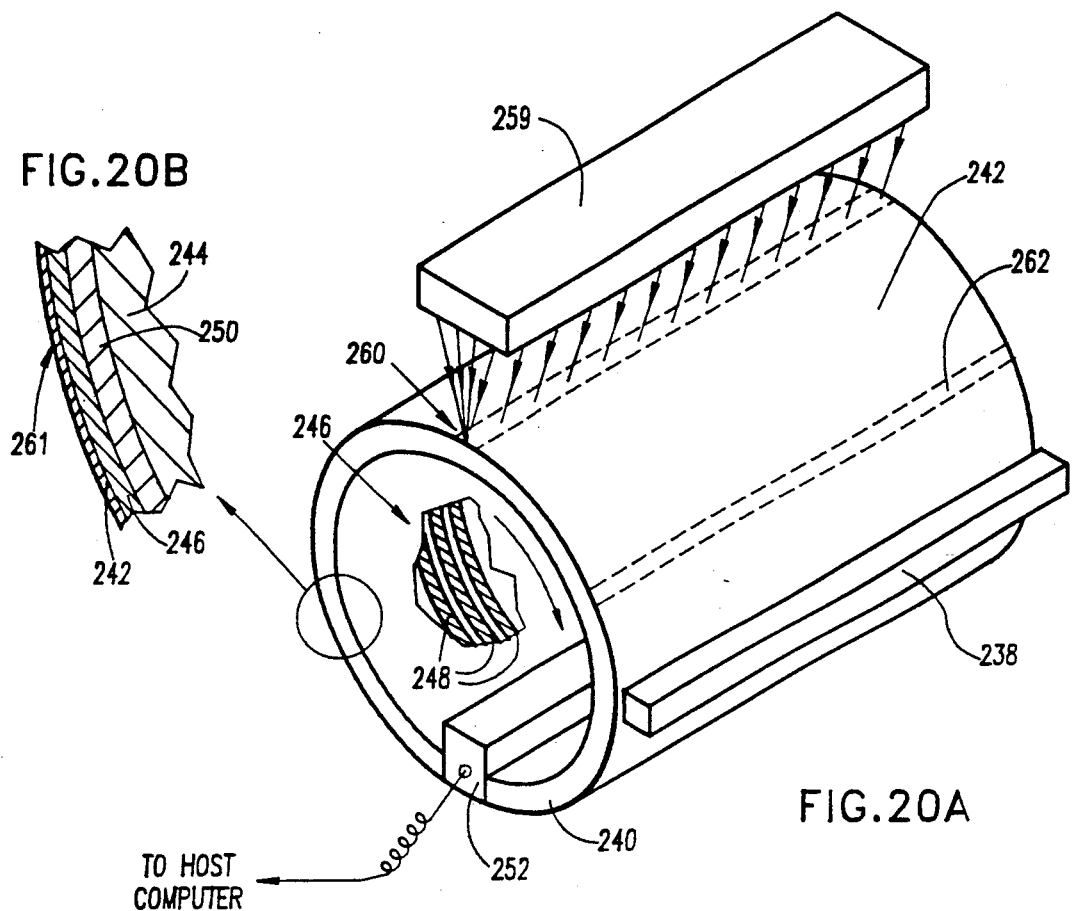
FIG.20B
FIG.20A
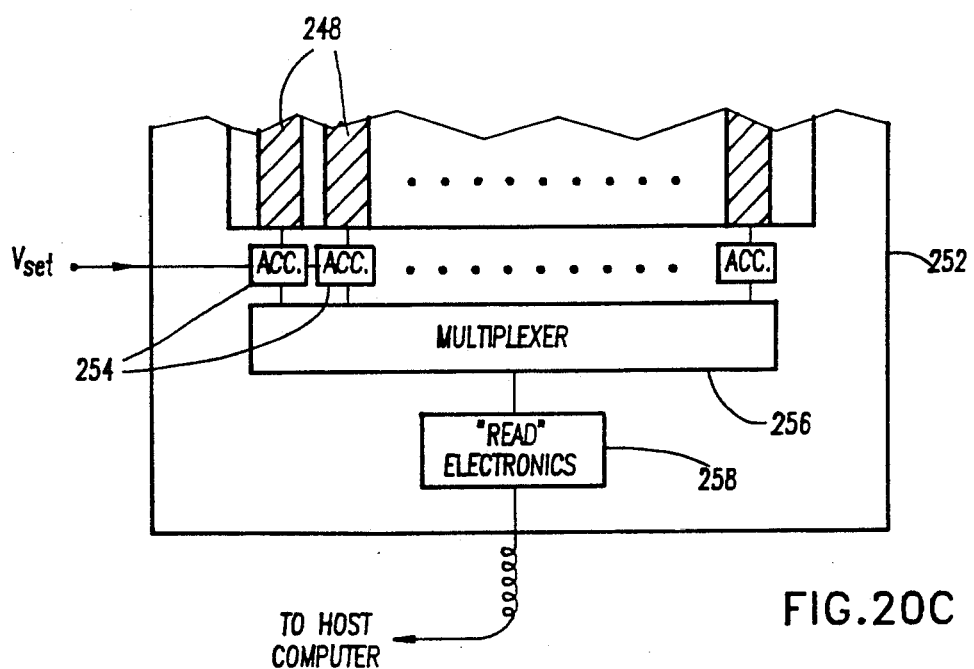
FIG.20C

5,289,214

APPARATUS FOR INFORMATION TRANSFER INCLUDING A DIELECTRIC ELEMENT AND GENERALLY NON-IMAGEWISE CHARGE SERVICE

REFERENCE TO CO-PENDING APPLICATIONS

This is a continuation-in-part of U.S. patent application Ser. No. 07/697,166, filed May 8, 1991.

FIELD OF THE INVENTION

The present invention relates to apparatus and methods for non-contact printing, reading and imaging.

BACKGROUND OF THE INVENTION

There exist in the patent literature disclosures of a great number of techniques for non-contact printing and imaging. The most widely used of these techniques is electrophotography wherein an electrostatic image is optically formed on a photoconductor, which is then developed with a toner. The toner image is transferred to a substrate and fused thereon.

An additional technique in general use is ionography, wherein an electrostatic image is formed on a dielectric substrate by firing charges directly on the substrate using an imagewise ion source.

A technique for the transfer of electrostatic images from a photoconductor dielectric onto a dielectric substrate has also been proposed in *Electrophotography* by R. M. Schaffert, 2nd Edition, Focal Press, London, 1975 at pages 166–176 and in U.S. Pat. No. 3,055,006. This technique, known as TESI (Transfer of Electrostatic Images) employs an imagewise optical signal to create a charge image on a photoconductor. The charge image is subsequently replicated onto a dielectric substrate by applying single polarity charges to a surface of the dielectric substrate opposite from that surface which faces the photoconductor.

SUMMARY OF THE INVENTION

There is provided in accordance with an embodiment of the present invention apparatus for information transfer and including a dielectric element having generally opposite first and second surfaces, an information bearing voltage pattern being associated with the first surface, an information bearing charge pattern being associated with the second surface and means for applying a flow of charges to the second surface, the flow of charges being operative to transfer information between the first and second surfaces.

Further in accordance with an embodiment of the present invention the information bearing voltage pattern does not exist simultaneously in time with the information bearing charge pattern, representing the same information.

Still further in accordance with an embodiment of the present invention the means for applying a flow of charges is operative to convert a voltage pattern at the first surface to a corresponding electrostatic charge pattern on the second surface, thereby providing an image writing function. The means for applying a flow of charges is also operative to convert a charge pattern on the second surface to a corresponding voltage pattern at the first surface, thereby providing an image reading function.

Moreover, in accordance with an embodiment of the present invention the apparatus includes apparatus for developing the electrostatic charge pattern and transferring the developed pattern to a permanent medium, thereby providing a printing function and apparatus for displaying an electronic image corresponding to the voltage pattern, thereby providing a read information output function.

In accordance with an embodiment of the present invention the dielectric element may be operative for storing the charge pattern. In such a case, the dielectric element may be a photoconductor which is maintained in conditions of darkness.

The dielectric element preferably is a photoconductor which is operative to provide the charge pattern on the second surface in response to an optical input thereto. A scanning operation may be carried out in operative association with the dielectric element.

Additionally in accordance with an embodiment of the present invention the apparatus also includes means for imagewise application of voltage to a first surface of the dielectric substrate.

There is also provided in accordance with an embodiment of the present invention a method for information transfer and including the steps of providing a dielectric element having generally opposite first and second surfaces, associating an information bearing voltage pattern with the first surface, associating an information bearing charge pattern with the second surface, and applying a flow of charges to the second surface for transfer of information between the first and second surfaces. The step of associating the voltage pattern does not take place simultaneously in time with the step of associating the information bearing charge pattern.

The step of applying a flow of charges is operative to convert a voltage pattern at the first surface to a corresponding electrostatic charge pattern on the second surface, thereby providing an image writing function, and to convert a charge pattern on the second surface to a corresponding voltage pattern at the first surface, thereby providing an image reading function.

In accordance with an embodiment of the present invention, the method also includes the steps of developing the electrostatic charge pattern and the step of transferring the developed pattern to a permanent medium, thereby providing a printing function.

Furthermore, the method preferably includes the step of displaying the voltage pattern, thereby providing a read information output function and the step of imagewise application of voltage to a first surface of the dielectric substrate.

In accordance with a further embodiment of the present invention there is provided apparatus for reading an electrostatic charge pattern including a dielectric substrate having first and second opposite surfaces, a conductive backing operatively associated with the first surface, an information bearing charge distribution defining a pattern associated with the second surface, means for applying a flow of charges to the second surface thereby converting the information bearing charge pattern to a corresponding electrical signal in the conductive backing and means coupled to the conductive backing for sensing the electrical signal.

The means coupled to the conductive backing preferably includes capacitive means for receiving the electrical signal, and means coupled to the capacitive means for providing spatial pattern information corresponding to the electrical signal.

The means for providing spatial pattern information preferably comprises means for sensing the voltage on the capacitor in a time domain which corresponds to a spatial domain in which the pattern is defined. The means for sensing the voltage comprises sample and hold means.

In accordance with an embodiment of the present invention the flow of charges which is applied to the second surface of the dielectric substrate contains charges of both positive and negative polarities.

Further in accordance with an embodiment of the present invention there is provided a method for reading an electrostatic charge pattern including the steps of providing a dielectric substrate having first and second opposite surfaces, associating a conductive backing operatively with the first surface, associating an information bearing charge distribution defining a pattern with the second surface, applying a flow of charges to the second surface thereby converting the information bearing charge pattern to a corresponding electrical signal in the conductive backing and coupling sensing means to the conductive backing, and sensing the electrical signal.

The step of sensing includes the steps of providing accumulative means for receiving the electrical signal, providing spatial pattern information corresponding to the electrical signal.

The method provided in accordance with an embodiment of the present invention includes the step of sensing the voltage on the accumulative means in a time domain which corresponds to a spatial domain in which the pattern is defined. The voltage is sensed using sample and hold means.

In accordance with an embodiment of the present invention, in the apparatus for reading an electrostatic charge pattern the flow of charges which is applied to the second surface of the dielectric substrate contains charges of both positive and negative polarities and alternates in time between positive and negative charges.

Application of the charges to the second surface is operative to generate at the first surface a voltage pattern in accordance with the charge pattern on the second surface.

BRIEF DESCRIPTION OF THE DRAWINGS

The present invention will be understood and appreciated more fully from the following detailed description, taken in conjunction with the drawings in which:

FIGS. 4A and 4B are respective generalized and side view illustrations of apparatus for applying voltage and charges to opposite surfaces of a dielectric substrate in accordance with another embodiment of the present invention;

FIGS. 9A, 9B and 9C are diagrams illustrating the behavior of voltages at different points on the electronic circuit of FIGS. 8A and 8B;

FIGS. 14A and 14B are respective generalized and side view illustrations of apparatus for reading a charge pattern on the surface of a dielectric substrate in accordance with another embodiment of the present invention;

FIGS. 26A–20C are illustrations of the operation of an imaging system constructed and operative in accordance with a preferred embodiment of the present invention.

DETAILED DESCRIPTION OF A PREFERRED EMBODIMENT

Figure 1A:
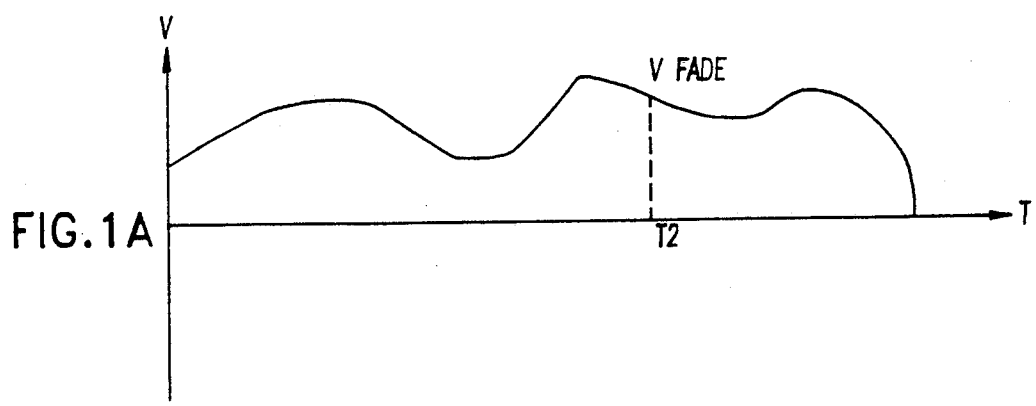
FIGS. 1A, 1B, 1C and 1D are illustrations of the application of voltage or charge on various surfaces over time in accordance with a preferred embodiment of the present invention.

Reference is now made to FIGS. 1A–1D, which illustrate the operation of the present invention. FIG. 1A illustrates an arbitrary voltage at a typical point location on a first surface of a dielectric substrate as it varies over time. The voltage may be applied to the typical point location by means of a conductive backing associated with the first surface of the dielectric substrate in touching or capacitive relationship therewith. The conductive backing may be a separate conductor in close proximity to, or alternatively a permanent coating or layer formed on, the first surface of the dielectric substrate.

Figure 1B:
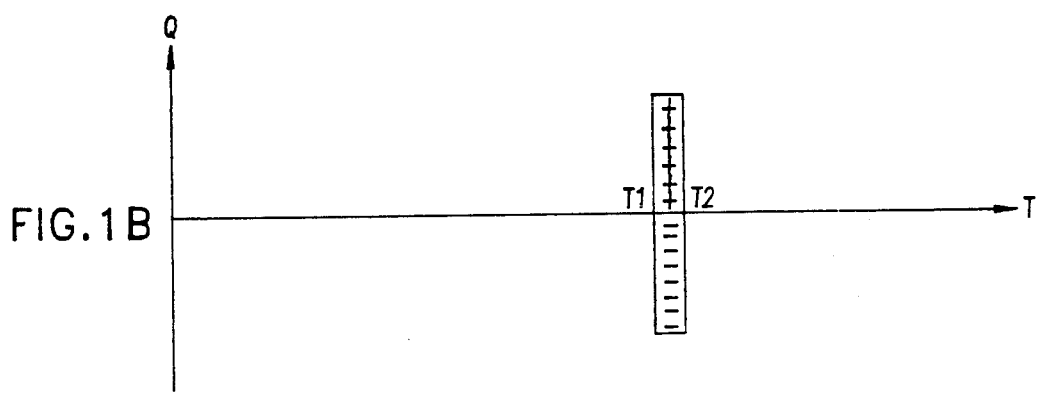

FIG. 1B illustrates, on the same time scale as in FIG. 1A, the application of a flow of charges to a second surface of the dielectric substrate, which is opposite to and generally uniformly spaced from the first surface, to temporarily neutralize the effect on the second surface of the voltage applied to the first surface. Following application of such charges the second surface retains a charge corresponding to the voltage which was applied to the first surface, at the time T2 that the application of such charges ceased, but of an opposite polarity thereto.

According to a preferred embodiment of the invention, the flow of charges comprises an alternating polarity charge flow to a second surface of the dielectric substrate which is opposite to and generally uniformly spaced from the first surface. It is preferred that the time variation of the voltage applied to any given location on the first surface be sufficiently small such that at least during an end portion of the duration of the alternating polarity charge flow at such location, the voltage variation is generally zero.

The alternating polarity charge flow at each location is represented in FIG. 1B by a stack of positive and negative charges. The beginning and end of the duration of the application of the alternating polarity charge flow at each location are indicated in FIG. 1B respectively as TI and T2.

Figure 1C:
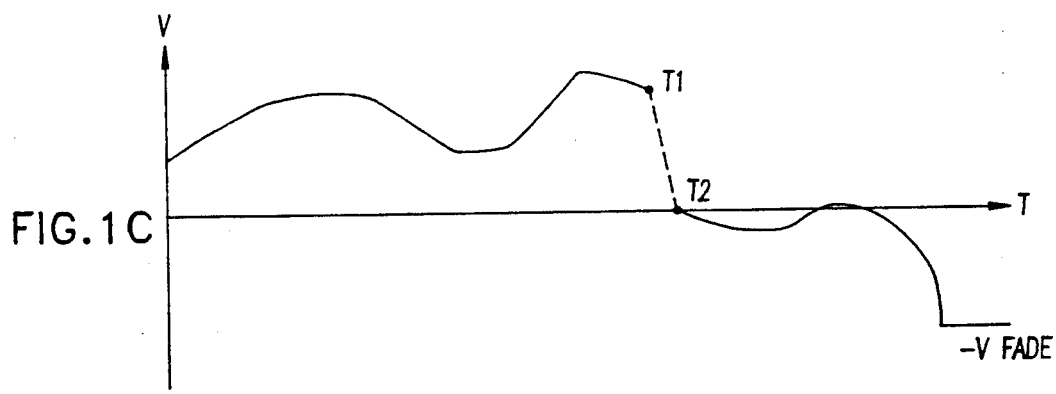

FIG. 1C illustrates the voltage on the second surface of the dielectric substrate. It is noted that this voltage tracks the voltage on the first surface until the charge flow begins at time T1. Upon termination of the charge flow at time T2, the voltage of the second surface is very nearly zero. Thereafter if the voltage on the first surface becomes zero, the voltage on the second surface becomes approximately the negative of the voltage on the first surface at time T2, due to charge accumulation on the second surface.

Figure 1D:
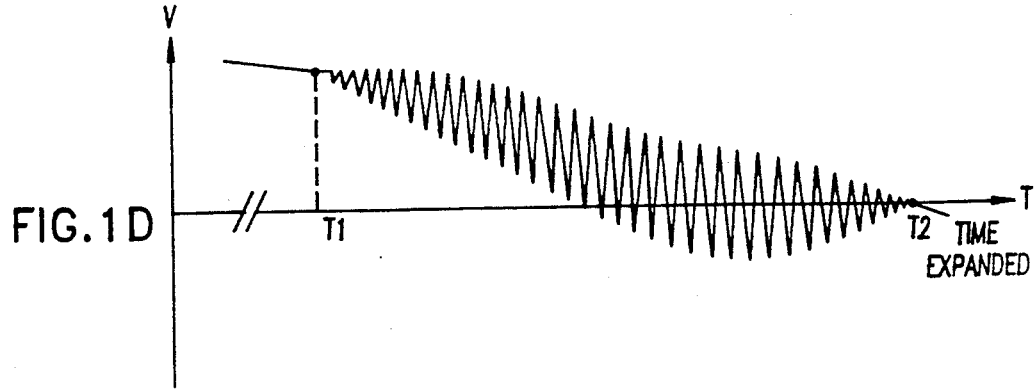

FIG. 1D is an expanded time scale illustration corresponding to FIG. 1C and illustrating with greater particularity one possible application of an alternating charge flow to the second surface, which results in a reduction in the voltage on the second surface from the voltage at T1 to very nearly zero at T2.

Figure 2:
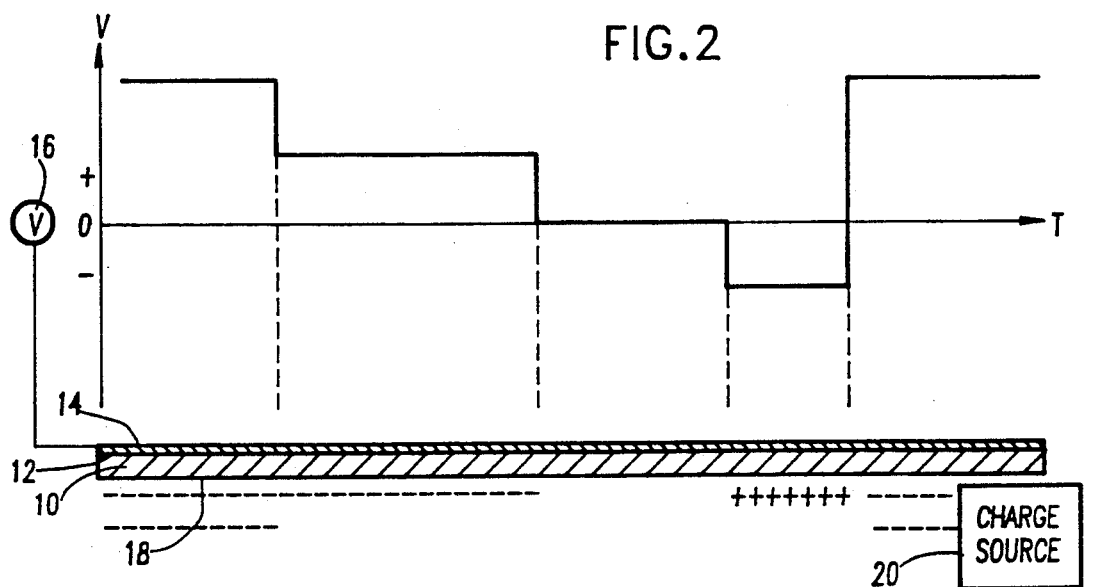
FIG. 2 is an illustration of a time varying voltage pattern on a first surface of a dielectric substrate resulting in a corresponding charge pattern on an opposite surface of the dielectric substrate in accordance with a preferred embodiment of the present invention.

Referring now to FIG. 2, there is shown schematically an arbitrary voltage pattern provided on a dielectric substrate 10 at a first surface 12 thereof, which is preferably backed with a conductive backing 14 to which is coupled a time-variable voltage source 16. FIG. 2 also illustrates in one dimension, the corresponding spatial charge pattern, of opposite Polarity to the corresponding voltage pattern, which is produced on a second surface 18 of the dielectric substrate in accordance with the present invention, by application of a flow of alternating polarity charges to the second surface which is operative to temporarily neutralize the effect on the second surface of the voltage applied to the first surface 12. The application of the flow of charges is preferably provided by an alternating polarity charge source (APCS) 20, such as an AC corona, capable of achieving a spatial edge accuracy consistent with the desired resolution. Such an AC corona may be realized by employing one or more corona wires or needles enclosed within a shield having a defined charge outlet opening and by amplitude modulation of the AC voltage supplied to the corona wire or wires.

The charge source 20 is preferably moved at a velocity v along the second surface 18 of the dielectric substrate 10, indicated by an arrow 22.

Figure 3:
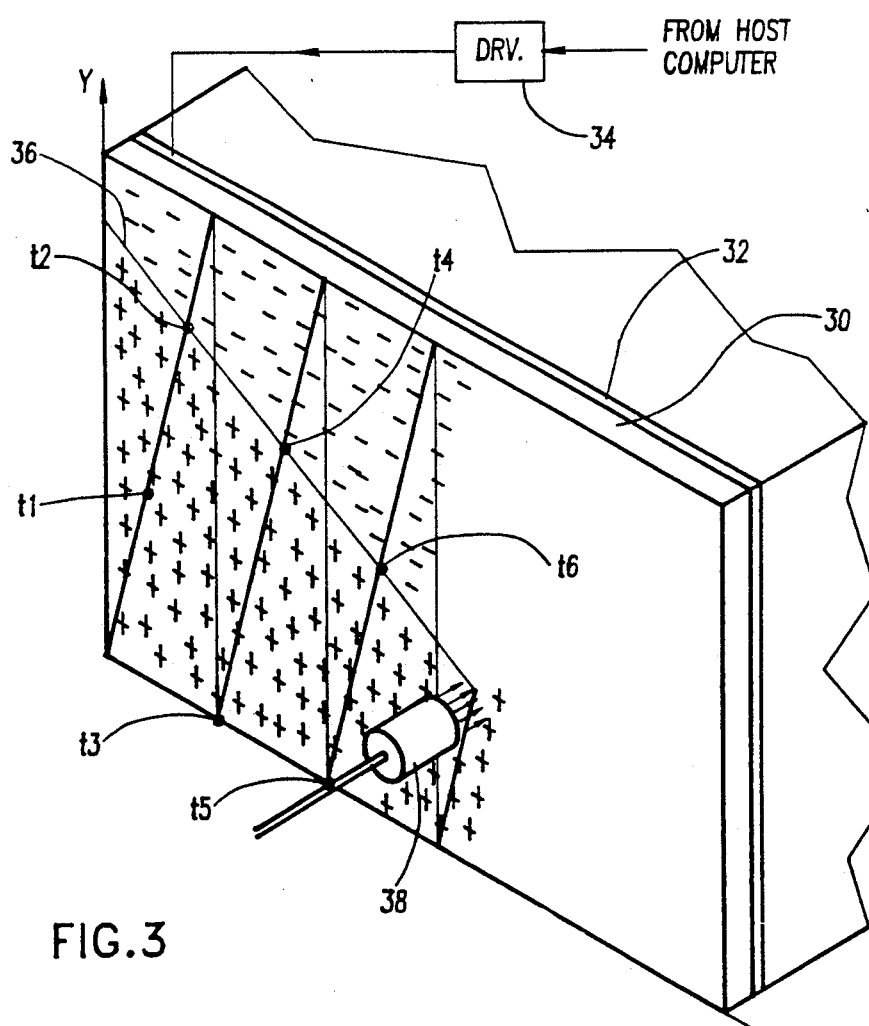
FIG. 3 is a pictorial illustration of apparatus for applying voltage and charges to opposite surfaces of a dielectric substrate in accordance with one embodiment of the present invention.

Reference is now made to FIG. 3 which is a pictorial illustration of apparatus for applying voltage and charges to opposite surfaces of a dielectric substrate 30 in accordance with one embodiment of the present invention. In this embodiment, a conductive plate 32 may be disposed adjacent a first surface of the dielectric substrate 30 and may receive a time-varying voltage from a voltage driver 34, which may be controlled by a host computer.

In the illustrated embodiment, it is desired to produce or write on a second surface a charge pattern which is uniformly negative above a diagonal line 36 and is uniformly positive below the diagonal line. It is appreciated that any suitable charge pattern may be produced using the apparatus and technique illustrated in FIG. 3 and described herein.

A charge source 38, such as that described above, which produces charges which vary in polarity as a function of time, scans the second surface of the dielectric substrate 30 along an arbitrary pattern, such as the up/down and sideways pattern illustrated in FIG. 3.

As described above, in accordance with a preferred embodiment of the invention, as the charge source 38 moves out of charge supply engagement with a given location on the second surface of the substrate 30, at a given time, the residual charge at such location corresponds to the negative of the voltage on the first surface at such time. Thus, it may be appreciated, the modulation of the voltage on conductive plate 32, coordinated with the two dimensional position of the charge source 38 on the second surface enables charge writing on the second surface by information content modulation of the voltage applied to the first surface.

Figure 7A:
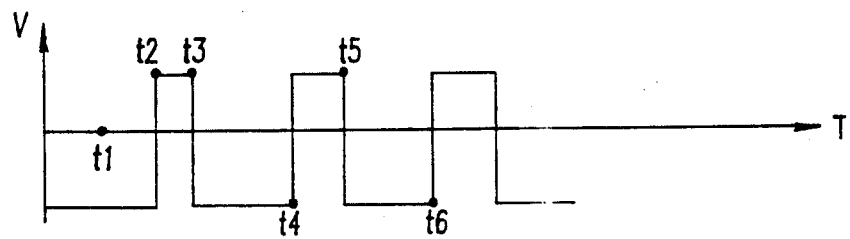
FIGS. 7A, 7B and 7C are diagrams of various operational parameters of the apparatus of FIG. 3.
Figure 7B:
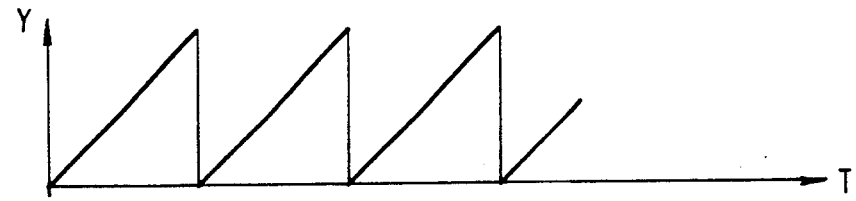
Figure 7C:
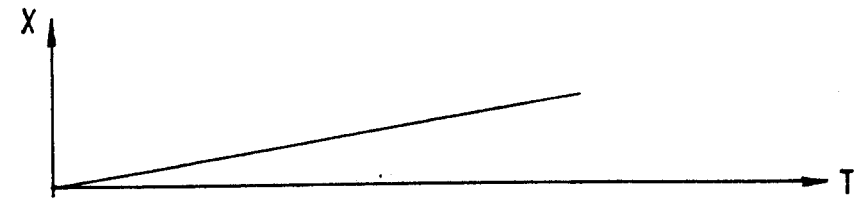

The operation of the apparatus of FIG. 3 may be appreciated and understood better by means of reference to FIGS. 7A-7C. FIG. 7A-7C, which all lie along the same time scale, illustrate operational parameters of the operation of the apparatus of FIG. 3. FIG. 7A, illustrates the voltage applied to the conductive backing layer 32 and thus to the first surface of the dielectric substrate as a function of time. The indications. t1-t6 illustrate the position of the charge source 38 at various times.

FIGS. 7B and 7C illustrate the Y and X positions of the charge source 38 as a function of time.

Reference is now made to FIGS. 4A and 4B which illustrate apparatus for applying voltage and charges to opposite surfaces of a dielectric substrate 42 in accordance with another embodiment of the present invention.

In this embodiment, an elongate alternating polarity charge source (EAPCS) 46, such as that described above and being capable of achieving a spatial edge accuracy consistent with the desired resolution, but employing elongate wires instead of needles, is scanned in one dimension, perpendicular to its longitudinal axis, along the second surface 48 of substrate 42, by means of a linear drive mechanism including a worm screw 50 cooperating with a screw rider 52, fixed to source 46. An electric motor 54 drives the worm screw 50 in response to the outputs of a commercially available synchronized driver 56. A host computer (not shown) provides positioning instructions via a multiplexer 58 to driver 56.

In this embodiment, a multisectional conductive backing layer 60, typically comprising a plurality of elongate strips 44, is associated with the first surface of the dielectric substrate 42. Each strip 44 is provided with an information content modulated time varying voltage via a corresponding driver 62, in response to control signals received from the host computer via multiplexer 58.

It may be appreciated that in the embodiment of FIGS. 4A and 4B a charge pattern is written on the second surface by information content modulation of voltages applied simultaneously to the different regions of the first surface of the dielectric substrate 42 via strips 44 in synchronism with the one dimensional scanning motion of source 46.

It will be appreciated that in principle due to the parallel voltage "writing", the apparatus of FIGS. 4A and 4B has an intrinsically greater writing speed than the apparatus of FIG. 3.

It is appreciated that a desired two-dimensional spatial resolution may be achieved by adjusting appropriate parameters. In a first dimension, the parameters to be adjusted include the width of the elongate strips 44, the width of a gap 45 between adjacent strips 44 and the thickness of the dielectric layer 42. In a second dimension, the parameters include the edge definition of the EAPCS 46.

Figure 5A:
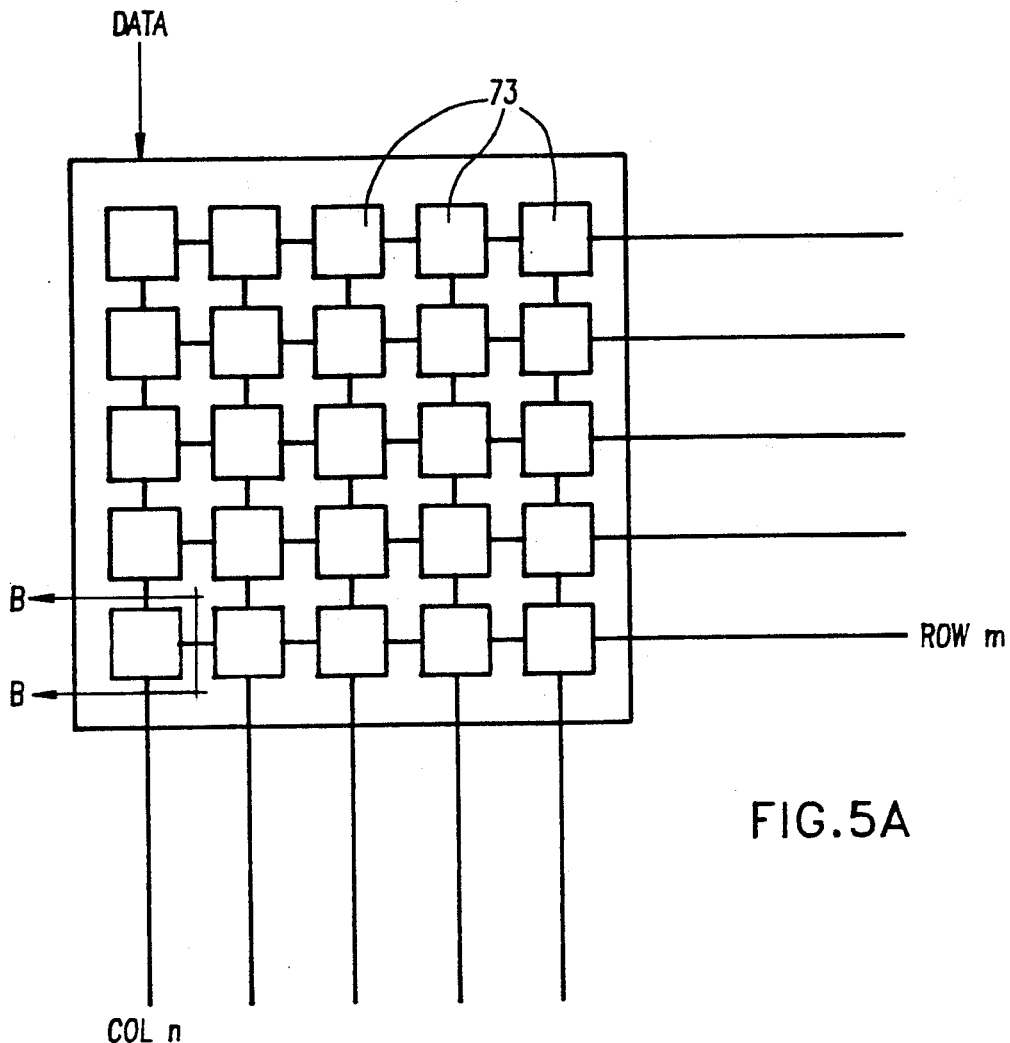
FIGS. 5A and 5B are respective generalized and detail illustrations of apparatus for applying voltage and charges to opposite surfaces of a dielectric substrate in accordance with yet another embodiment of the present invention.
Figure 5B:
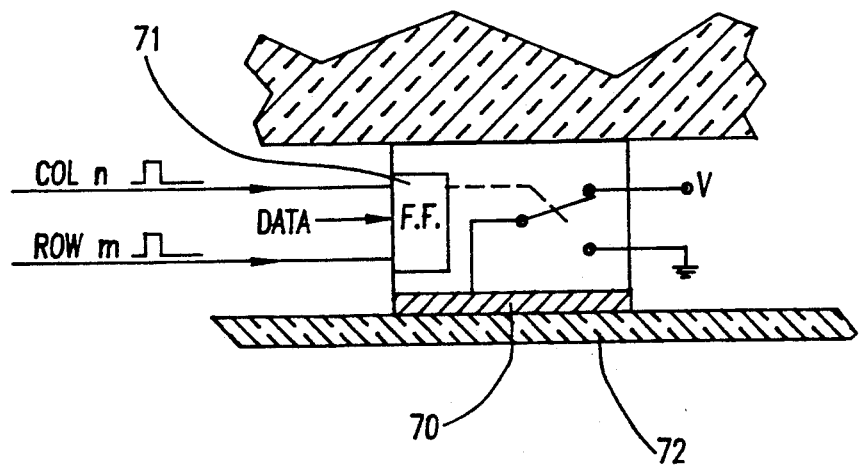

Reference is now made to FIGS. 5A and 5B which are respective generalized and detail illustrations of apparatus for applying voltage and charges to opposite surfaces of a dielectric substrate in accordance with yet another embodiment of the present invention. Here strips 44 in the embodiment of FIGS. 4A and 4B are replaced by a two dimensional array of pixel sized conductive pads 70 which define a two-dimensionally addressable array 73 disposed adjacent the first surface of a dielectric substrate 72. In this case, the alternating polarity charge source need not scan the first surface but instead may uniformly deposit charges thereover.

It may be appreciated that in the embodiment of FIGS. 5A and 5B a charge pattern is written on the second surface by information content modulation of voltages applied simultaneously to the different regions of the first surface of the dielectric substrate 72 via individual pads 70. In this case, a scanning alternating polarity charge source having precisely defined edge resolution need not be provided and may be replaced by static apparatus for supplying a uniform flow of alternating polarity charges over the entire array 73.

FIG. 5B illustrates a schematic arrangement for addressing a given pad 70, corresponding to a given area element or pixel on the dielectric surface, with either a given voltage or ground.

When a pixel (m,n) is addressed using matrix addressing techniques, the common input data is stored by a data flip-flop 71 associated with pixel (m,n), determining when voltage V is provided to the conductive backing on the dielectric substrate 72 at the corresponding location.

Figure 6A:
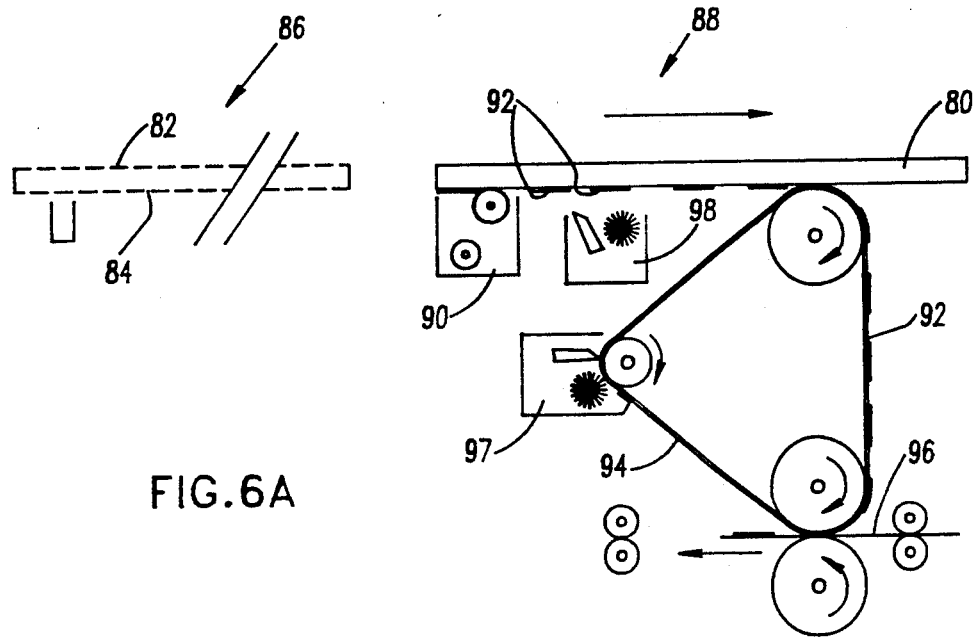
FIGS. 6A and 6B are simplified illustrations of apparatus for printing constructed and operative in accordance with a preferred embodiment of the present invention.
Figure 6B:
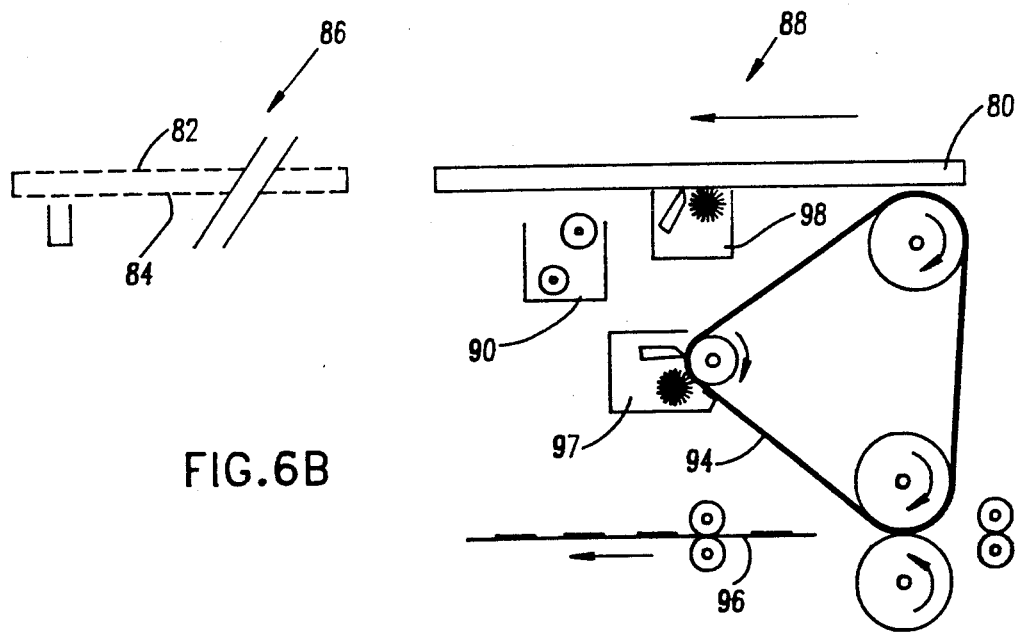

Reference is now made to FIGS. 6A and 6B which illustrate an imaging system constructed and operative in accordance with a preferred embodiment of the present invention and comprising a dielectric substrate 80 having a first surface 82 and a second surface 84. The dielectric substrate 80 may be self-supporting or alternatively supported on a suitable support, such as a plate of glass.

The imaging system includes a charge patterning station 86 and a toner application and printing station 88. In this embodiment, the dielectric substrate 80 is reused and moves repeatedly between the stations 86 and 88. The charge patterning station 86 preferably comprises apparatus of the general type described in connection with the embodiment of FIG. 4, while the toner application and printing station 88 may be any conventional toner application and printing device.

It is appreciated that a printing and imaging system may equally be operative using a charge patterning station according to any embodiment of the invention, including, without limitation, those illustrated in FIGS. 3–5B.

For example, station 88 may comprise conventional toner application apparatus 90 for applying toner to a charged surface of a dielectric, thereby providing a toner image on the second surface, as indicated by reference number 92 and an intermediate transfer member 94 for transferring the toner image 92 onto a final substrate 96, such as paper, onto which the toner image is fused by conventional techniques. A cleaning unit 97 cleans the intermediate transfer member 94 following transfer.

FIG. 6A illustrates the stage of toner application and transfer to the final substrate, while FIG. 6B illustrates cleaning of the dielectric substrate 80 by a conventional cleaning unit 98.

The unique feature of the apparatus of FIGS. 6A and 6B lies in the fact that unit 86 comprises apparatus in which a charge source along the second surface of the dielectric substrate 80 temporarily neutralizes the effect on the second surface of the voltage applied to the first surface, whereby following application of such charges, the second surface retains a charge corresponding to the voltage applied to the first surface at the time that the application of charge at each given location was discontinued.

It is appreciated that imaging and printing systems may be provided wherein the intermediate transfer member may be eliminated and thus the dielectric substrate 80 on which the charge image is initially formed is the final substrate to which the toner image is eventually fused. As a further alternative, transfer of the toner image on the dielectric substrate 80 directly to a final substrate may be provided.

The foregoing apparatus and techniques may be employed inter alia for mask generation in three-dimensional modeling systems such as those described in assignee's U.S. Pat. No. 4,961,154.

Figure 8A:
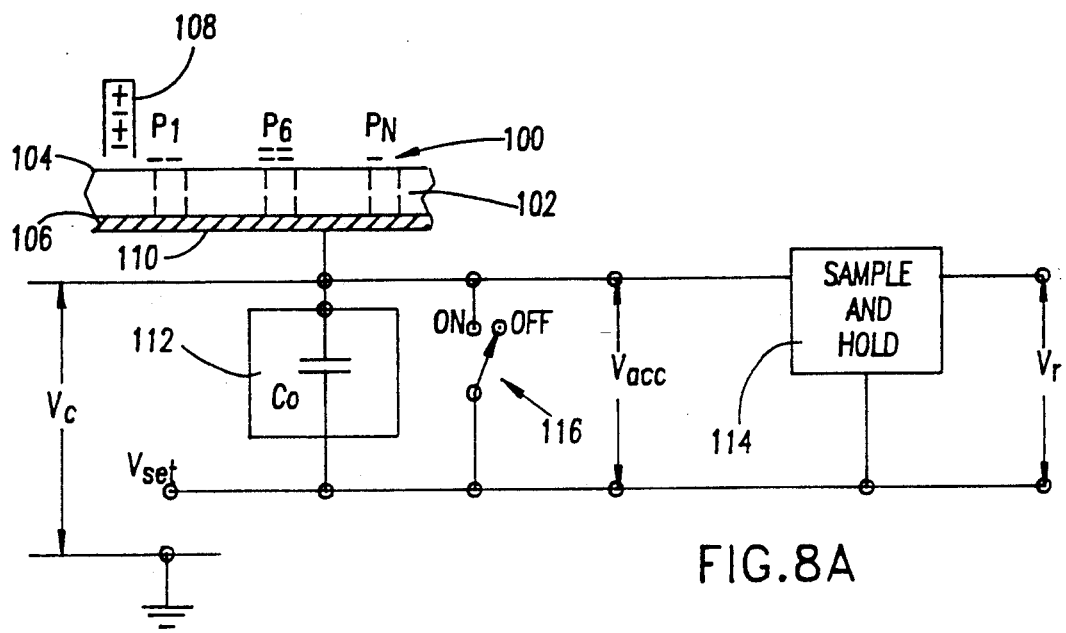
FIGS. 8A and 8B are illustrations of apparatus for reading an electrostatic charge pattern on a surface of a dielectric substrate.
Figure 8B:
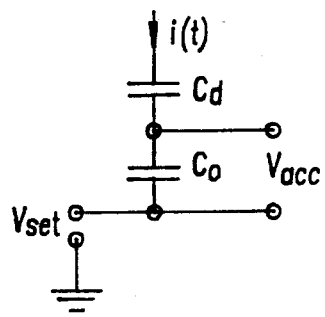

Reference is now made to FIGS. 8A and 8B which illustrate apparatus for reading an electrostatic charge pattern 100 on a surface of a dielectric substrate 102. The dielectric substrate can be any suitable dielectric substrate and may include a photoconductor or any substrate which exhibits dielectric qualities at a given time.

The charge pattern 100 to be read is created by any suitable technique on a surface 104 of a dielectric substrate having first and second opposite surfaces 104 and 106, such as any dielectric substrate described hereinabove. The charge pattern 100 is distributed over discrete regions (P1..PN) of the substrate.

In accordance with an embodiment of the invention, each region of the pattern is read individually using the technique described below. Each such region typically defines a pixel. Normally a two dimensional pixel distribution is envisioned. For convenience of illustration, only one dimension is illustrated in many of the drawings herein.

As illustrated in FIG. 8A, an alternating polarity charge source (APCS) 108, which may be as mentioned hereinabove, is employed to supply a flow of charges to the region P1 of surface 104. As the flow of charges is supplied to the region P1, a current is induced in a conductive backing 110 lying adjacent surface 106 and a charge, corresponding to the charge originally at region P1, is accumulated, preferably by capacitive means 112. The capacitive means is electrically coupled to the conductive backing 110 and comprises a capacitor having a capacitance of $C_o$.

Electronic means for sensing and measuring the accumulated charge, typically including a sample and hold device 114, are coupled to the capacitive means. Preferably the electronic means further comprises an electronic switch 116 which, when open, causes charge to accumulate in the capacitive means 112. When the electronic switch 116 is closed, the capacitive means 112 is discharged and reset. An output of the electronic means, an analog voltage $V_r$, is indicative of the voltage at region P1 prior to the supply of charges thereto by APCS 108. The voltage $V_r$ may be serially stored in an external digital memory device (NOT SHOWN) by using an analog to digital converter.

The steps of supplying a flow of charges and then sensing the generated electronic signal may be repeated across the entire substrate resulting in serial data outputs from pixel regions P1 to Pn where n is the number of pixels on the substrate. The serial data of the different regions represents the entire pattern.

FIG. 8B illustrates an equivalent circuit corresponding to the electrical relationship of the APCS 108, the substrate 102, the conductive backing 110 and the capacitive means 112. The electronic means comprising switch 116 and sample and hold circuit 114 may be collectively referred to as "read electronics".

Reference is now made to FIGS. 9A-9C which illustrate the behavior of voltages at different points on the electronic circuit described in FIGS. 8A and 8B.

FIG. 9A illustrates the status of the electronic switch 116. When closed, switch 116 causes the capacitor 112 to discharge and reset. When switch 116 is open, the capacitor 112 may accumulate charge.

FIG. 9B illustrates the effective voltage across the capacitor 112 as a function of time. At time T1, the APCS 108 begins to sweep over region P1 and supplies a net flow of charges to that region, inducing a current flow from the conductive backing 110 to capacitor 112, producing accumulation of charge thereat.

This current flow continues until time T2, when the net effect of the charge flow from the APCS 108 on pixel P1 is zero. At time T2, the voltage across the capacitor 112, $V_{acc}$, is sampled and processed by the sampling and hold circuit 114. FIG. 9C graphically illustrates output voltage $V_r$ as a function of time.

The equivalent circuit of FIG. 8B can be further employed to describe the behavior of the apparatus of FIG. 8A. The dielectric substrate 102 is represented by capacitor $C_d$ in FIG. 8B. The surface charge at an arbitrary pixel P1, associated with the charge pattern previously present on the surface 104 of the substrate 102 is denoted, for the purposes of the discussion which follows, as $Q_d$ and the voltage $V_d$ across the dielectric, associated with this charge is:

$$V_d = Q_d/C_d \tag{1}$$

The APCS 108 provides a flow of charges to the dielectric surface 102 causing charging of the accumulator 112. This may be envisioned as the result of an equivalent current flow i across both the dielectric $C_d$ and the capacitor $C_o$, which represents accumulator 112.

Consequently, the potential across the dielectric changes from $V_d$ to $V_d^*$ where $$V_d^* = V_d + 1/C_d \int i\, dt \text{ from } T1 \text{ to } T2 \tag{2}$$

where T1 and T2 are the T1 and T2 defined in association with FIG. 9B and i is the current flowing.

Simultaneously a voltage $V_{acc}$ develops across capacitor $C_o$ where:

$$V_{acc} = 1/C_o \int i\, dt \text{ from } T1 \text{ to } T2 \tag{3}$$

According to the above description of the operation of the APCS, the effective flow of net charge to the pixel P1 at the dielectric surface continues until the potential resulting from both the residual charge on surface 104 and the voltage of the conductive backing 110 at pixel P1 is effectively zero. Therefore at T2 the potential $V_d^*$ is given by $$V_d^* = -(V_{set} + V_{acc}) \tag{4}$$

The value of $V_{acc}$ is obtained by combining equations 1-4 where $$V_{acc} = -(V_{set} + V_d)\, C_d/(C_d + C_o) \tag{5}$$

For a particular case where $V_{set}$ is ground $$*V_{acc} = -aV_d \tag{6}$$

where a is defined as:

$$a = C_d/(C_d + C_o) \tag{7}$$

The value for $C_o$ may be determined by examining the ratio between the voltage $V_d$, prior to APCS charge supply, and $V_{acc}$. Since the potentials of electrostatic images are typically on the order of hundreds of volts and $V_{acc}$ is desirably no more than a few volts, a typical value for $C_o$ is 100 times greater than the pixel capacitance $C_d$.

It is further appreciated that since $V_{acc}$ is considerably smaller than $V_{set}$, the ultimate potential across the dielectric surface is practically equal to $V_{set}$, irrespective of the previous charge $Q_d$.

Figure 10A:
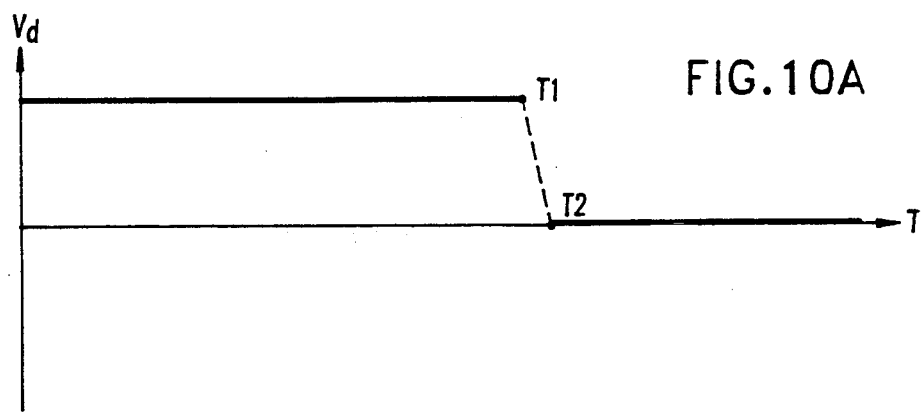
FIGS. 10A, 10B, 10C and 10D are diagrams illustrating the operation of the apparatus of FIGS. 8A and 8B at a single pixel location on the surface of the dielectric substrate.

Reference is now made to FIGS. 10A-10D, which illustrate the operation of the apparatus of FIGS. 8A and 8B at a single pixel location on the surface of the dielectric substrate 102. FIG. 10A illustrates the voltage $V_d$, at that same pixel location as it varies with time for a case where $V_{set}$ is ground. Therefore following the sweep of the APCS of the pixel location, the voltage remaining thereat is effectively zero.

Figure 10B:
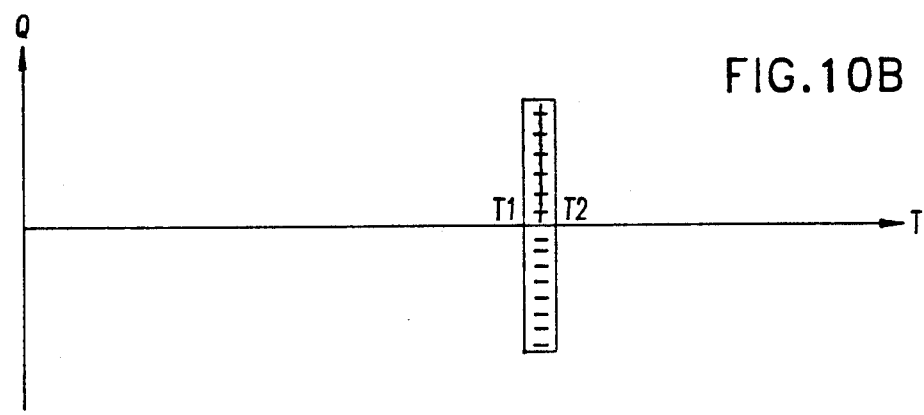

FIG. 10B illustrates, on the same time scale as that of FIG. 10A, the application of a flow of charges by the APCS to the same pixel location whereby, following application of such flow of charges, the voltage at that pixel location is zero.

In accordance with the illustrated preferred embodiment of the invention, the flow of charges comprises an alternating polarity charge flow to the surface of the dielectric substrate. This charge flow occurs over a time span which is short relative to the time necessary to sweep the pixel dimension along a given direction of motion of the APCS. Therefore, during this time span the location of the APCS relative to the pixel location does not change considerably, and the charge flow may be represented by a stack of positive and negative charges as shown in FIG. 10B. The beginning and end of the duration of the alternating polarity charge flow are indicated in FIG. 10B respectively as T1 and T2.

Figure 10C:
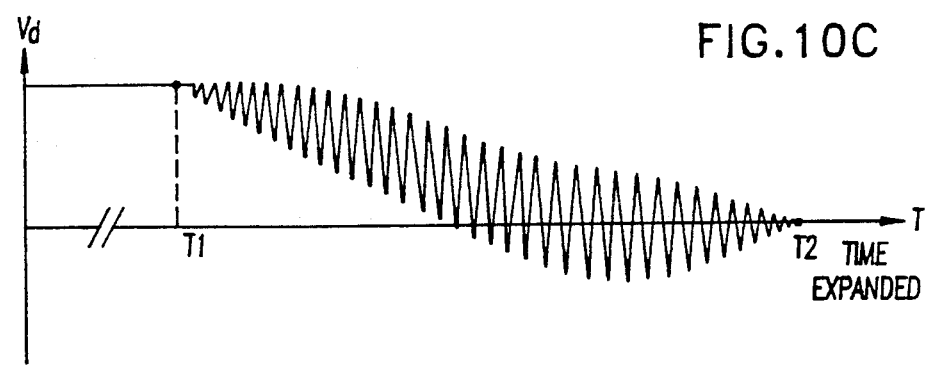

FIG. 10C is an expanded time scale illustration corresponding to FIG. 10A and illustrates with greater particularity one possible application of typical alternating charge flow to the surface 104 of the dielectric substrate 102, which produces a change in the voltage at the pixel location on surface 104 from the voltage at time T1 to effectively a zero voltage at time T2. The flow of charges illustrated induces a corresponding current in the conductive backing 110. The current induced in the conductive backing 110 causes a charge to be accumulated by the capacitor 112, which is electronically coupled to the conductive backing 110.

Figure 10D:
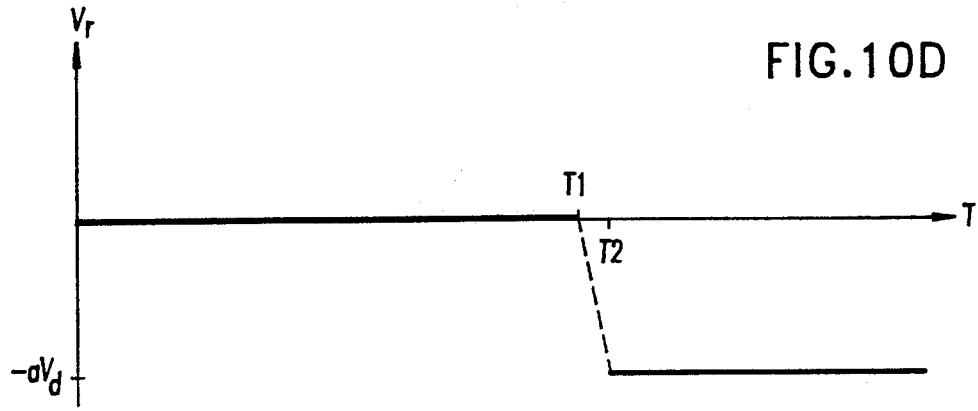

FIG. 10D illustrates the voltage $V_r$, output by the read electronics, which sense and measure the charge accumulated in capacitor 112. The voltage output by the read electronics is in direct negative proportion to the original charge at the pixel location at which the flow of charges was applied.

Figure 11A:
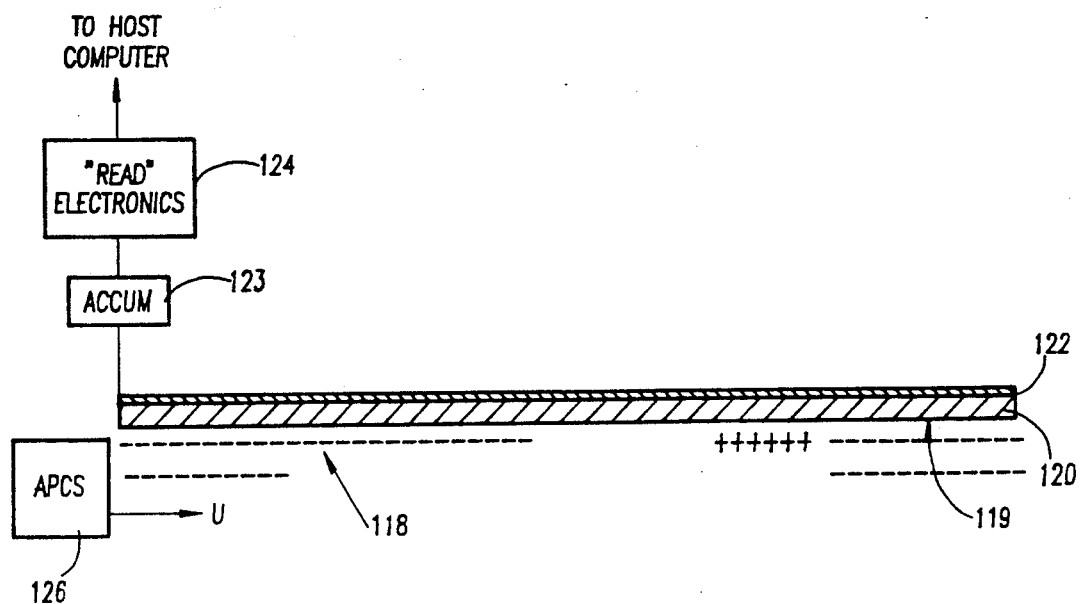
FIG. 11A is a schematic illustration of an arbitrary "original" charge pattern on a surface of a dielectric substrate.
Figure 11B:
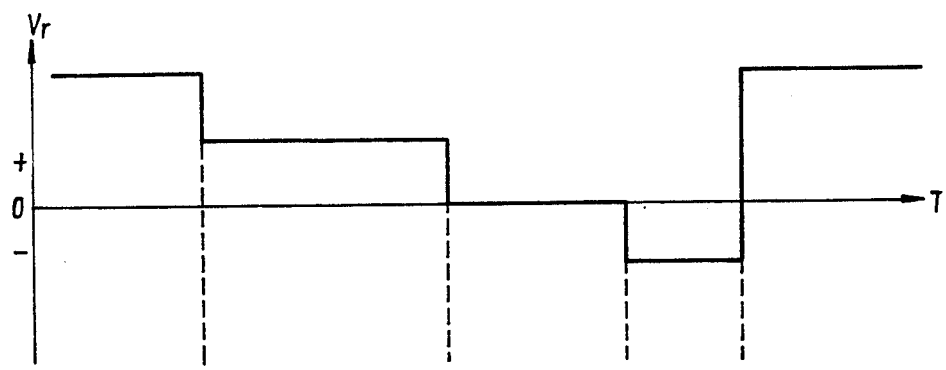
FIG. 11B is a diagram illustrating a voltage pattern which results from reading the charge pattern.

Referring now to FIG. 11A, there is shown schematically an arbitrary "original" charge pattern 118 on a surface 119 of a dielectric substrate 120, which substrate 120 is preferably backed with a conductive backing 122. Accumulative means 123 and read electronics 124, as described in FIGS. 8A and 8B, are electronically coupled to the conductive backing 122. Also illustrated is an alternating polarity charge source (APCS) 126, of the type illustrated in FIGS. 8A and 8B, which is typically capable of achieving a spatial edge accuracy consistent with a desired resolution. The APCS 126 is preferably moved at a constant velocity U along the surface of the dielectric substrate. FIG. 11B illustrates the voltage pattern which results from reading the charge pattern 118 in accordance with the techniques described hereinabove.

Figure 12:
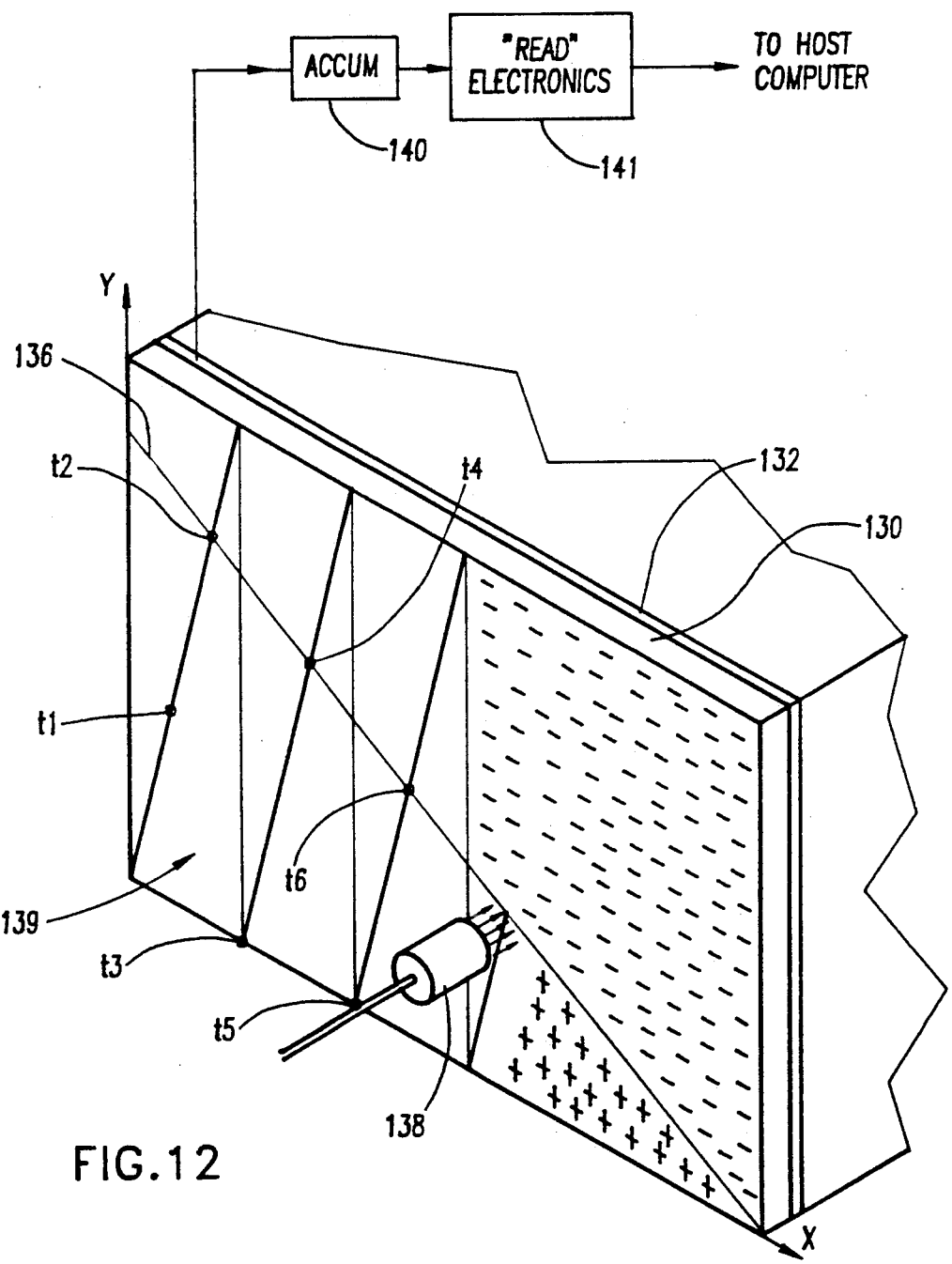
FIG. 12 is a pictorial illustration of apparatus for reading a charge pattern on a dielectric substrate.

FIG. 12 is a pictorial illustration of apparatus for reading a charge pattern on a dielectric substrate according to the steps described hereinabove in conjunction with FIGS. 8A and 8B.

A charge source 138, such as an APCS such as that described hereinabove in connection with FIG. 3, which produces charges which vary in polarity as a function of time, sweeps a surface 139 of a dielectric substrate 130 along an arbitrary pattern such as the up/down and sideways pattern of FIG. 12. Associated with the dielectric substrate 130 is a conductive backing 132.

In the illustrated embodiment, there is located on surface 139 a charge pattern which is uniformly negative above a diagonal line 136 and is uniformly positive below the diagonal line. It is appreciated that this charge pattern may be generated by any suitable technique.

As the charge source 138 sweeps and zeroes a pixel location on the substrate surface 139, accumulative means 140 and read electronics 141, in accordance with the technique described hereinabove, produce an output $V_r$ which corresponds to the voltage previously present at that pixel location.

Figure 13A:
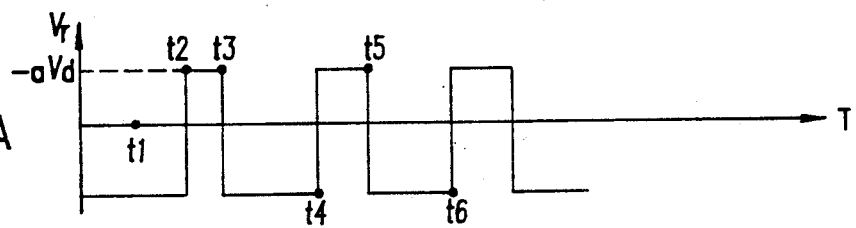
FIGS. 13A, 13B and 13C are diagrams of various operational parameters of the apparatus of FIG. 12.
Figure 13B:
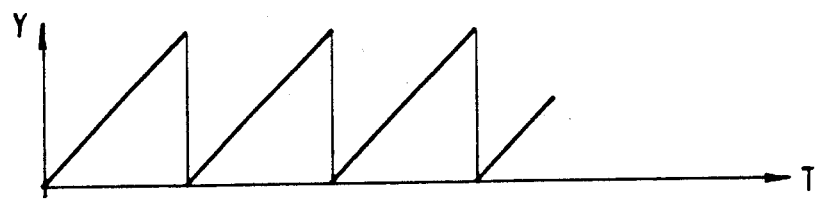
Figure 13C:
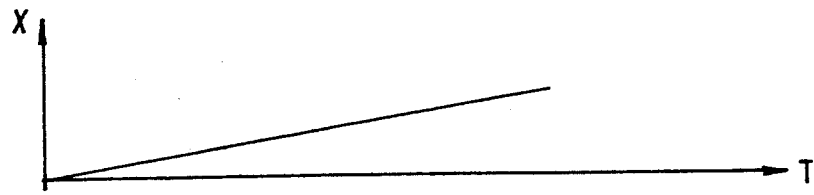

The operation of the apparatus of FIG. 12 may be appreciated and better understood by means of reference to FIGS. 13A-13C. FIGS. 13A-13C, all of which represent events taking place along the same time scale, illustrate operational parameters of the apparatus of FIG. 12.

FIG. 13A illustrates the voltage $V_r$ output by the read electronics 141 as a function of time. The time indications t1-t6 illustrate the position of the APCS 138 at various times. FIGS. 13B and 13C illustrate the Y and X positions of the APCS 138 as a function of time.

Reference is now made to FIGS. 14A and 14B which illustrate apparatus for reading a charge pattern on the surface of a dielectric substrate in accordance with another embodiment of the present invention. In this embodiment, an elongate alternating polarity charge source (EAPCS) 146, such as that described hereinabove in conjunction with FIG. 4., scans in one dimension, perpendicular to its longitudinal axis, along a surface 148 of a dielectric substrate 142, by means of a linear drive mechanism including a worm screw 150 cooperating with a screw rider 152, fixed to source 146. An electric motor 154 drives the worm screw 150. A commercially available synchronized encoder 156 provides position information about the EAPCS 146 to a host computer (NOT SHOWN) at any given time.

In this embodiment, a multisectional conductive backing layer 160, typically comprising a plurality of elongate strips 144, is associated with a surface of the dielectric substrate 142. Each strip 144 is associated with individual means 162 for accumulating the charge which flows from that strip. Typically the accumulating means 162 includes a capacitor.

A multiplexer 158 is associated with the individual accumulators 162 and functions to select the accumulator 162 whose output is sampled by read electronics 159 at any given time. The read electronics 159 measures the voltage stored in the selected accumulator 162 in accordance with the technique described hereinabove in conjunction with FIGS. 8A and 8B. Information from the read electronics 159 may be serially fed to a host computer (NOT SHOWN).

For read/write applications both accumulators 162 and drivers 62 (FIG. 4A) can be electronically coupled to the same conductive strips. The read electronics 159 may be activated in a time shared manner with the write electronics.

It is appreciated that a desired two-dimensional spatial resolution may be achieved by adjusting appropriate parameters. In a first dimension, the parameters to be adjusted include the width of the elongate strips 144, the width of the gap 145 between adjacent strips 144 and the thickness of the dielectric layer 142. In a second dimension, the parameters include the edge definition of the EAPCS 146 and time intervals between two subsequent sampling cycles of the read electronics 159 from the same accumulator.

Figure 15A:
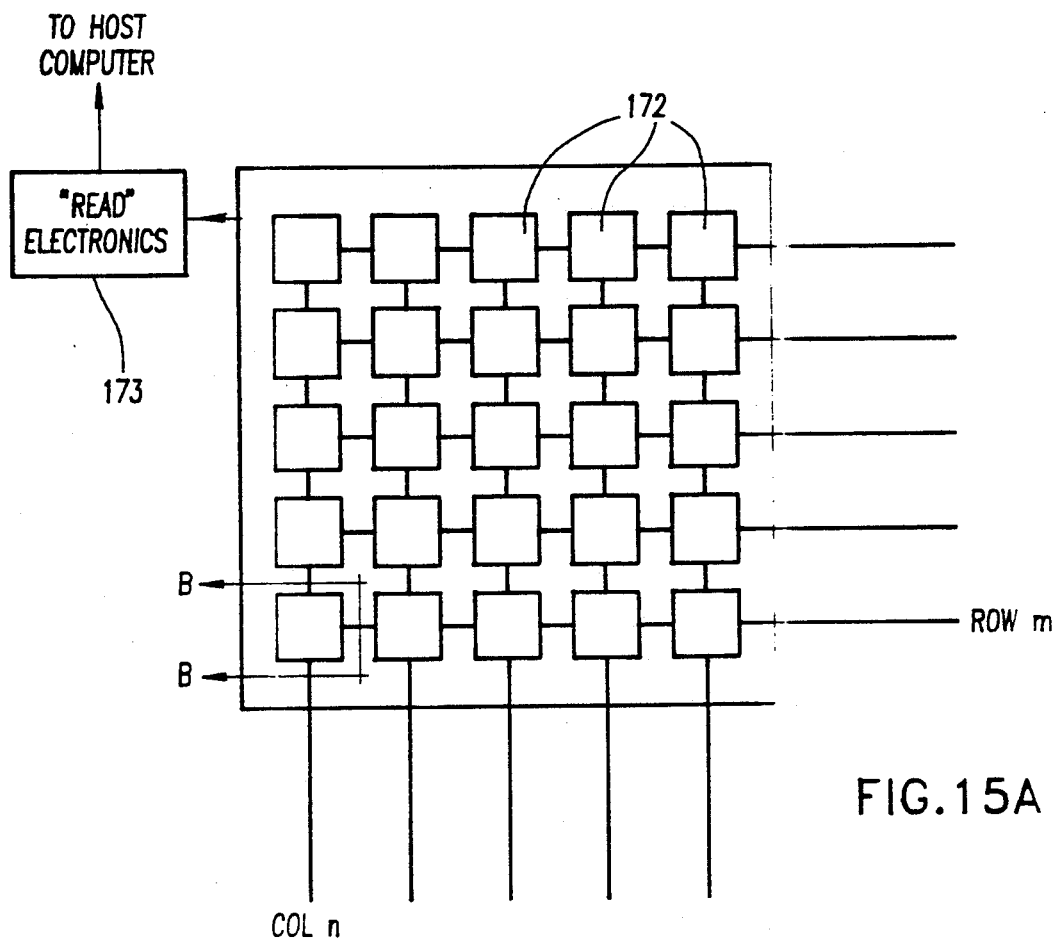
FIGS. 15A and 15B are respective generalized and detail illustrations of apparatus for reading a charge pattern on a dielectric substrate in accordance with yet another embodiment of the present invention.
Figure 15B:
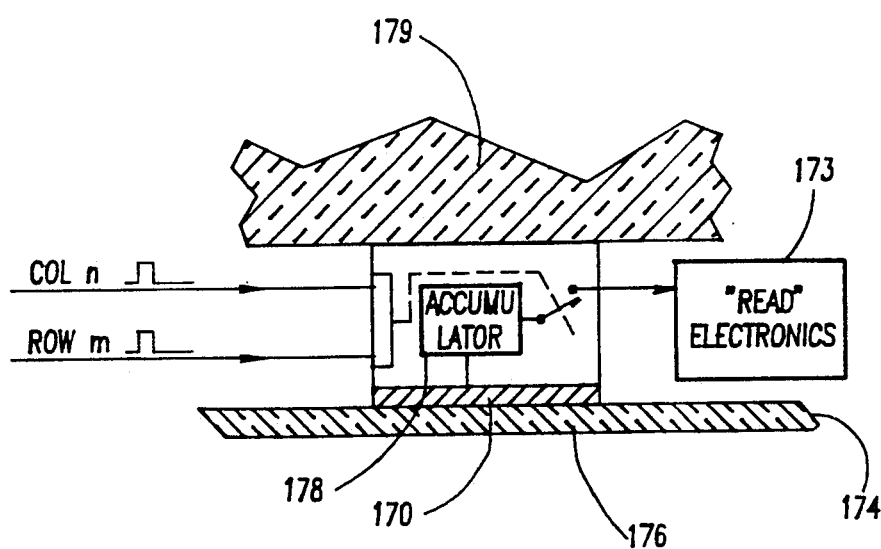

Reference is now made to FIGS. 15A and 15B which are respectively generalized and detail illustrations of apparatus for reading a charge pattern on a dielectric substrate in accordance with yet another embodiment of the present invention. Here, strips 144 in the embodiment of FIGS. 14A and 14B are replaced by a plurality of pixel sized conductive pads 170 which define a two-dimensionally addressable array 172 disposed adjacent a surface 174 of a dielectric substrate 176. Preferably, an accumulator 178 is associated with each pad 170 in the array 172. In this case, a scanning alternating polarity charge source having precisely defined edge resolution need not be provided and may be replaced by static apparatus for supplying a uniform flow of alternating polarity charges over the entire array 172. Read electronics 173 measures the voltage stored in a selected accumulator 178 in accordance with the technique described hereinabove in conjunction with FIGS. 8A and 8B. Information from the read electronics 173 may be serially fed to a host computer (NOT SHOWN). Accumulators are selected for reading by common matrix addressing techniques.

FIG. 15B illustrates a schematic arrangement for addressing a given pad 170, corresponding to a given area element or pixel on the dielectric surface 176. Mechanical support for the array of pads 172 is provided by a plate 179 which is typically glass.

For read/write applications both accumulators 178 and drivers associated with data flip-flops 71 (FIG. 5B) can be electronically coupled to the same conductive pads. The read electronics 173 may be activated in a time shared manner with the write electronics.

Figure 16B:
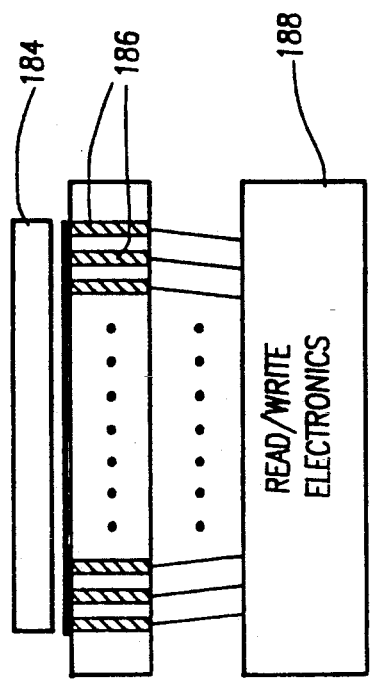
FIGS. 16A and 16B simplified illustrations of respective side and facing views of a system for reading and writing electrostatic images in accordance with a preferred embodiment of the present invention.
Figure 16A:
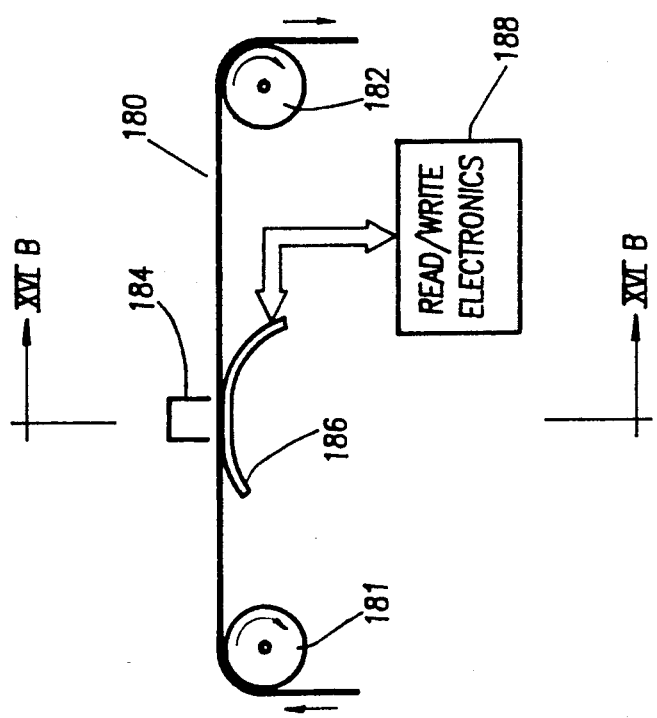

Reference is now made to FIGS. 16A and 16B which illustrate respective side and facing views of a system for reading and writing electrostatic images in accordance with a preferred embodiment of the present invention. The system comprises a dielectric substrate 180 which is displaced by rotating drums 181 and 182, and an EAPCS 184 associated with a plurality of parallel conductive strips 186 which function as a conductive backing for the portion of the dielectric substrate disposed intermediate EAPCS 184 and strips 186 at any given time.

Preferably the strips 186 have a slightly curved configuration as shown. Alternately, the strips may be of any suitable configuration.

A charge or voltage pattern present on dielectric substrate 180 may be read using the techniques described hereinabove, particularly those described in conjunction with FIGS. 14A and 14B, by read/write electronics 188 from that portion of the dielectric substrate that is disposed intermediate the strips 186 and the EAPCS 184.

A charge pattern may also be written onto the dielectric substrate 180 using the apparatus of FIGS. 16A and 16B in accordance with the techniques described hereinabove, particularly those described in conjunction with FIGS. 4A and 4B. According to a further embodiment of the present invention, the configuration of the read/write operations may be according to the apparatus of FIGS. 3 and 12.

Figure 17:
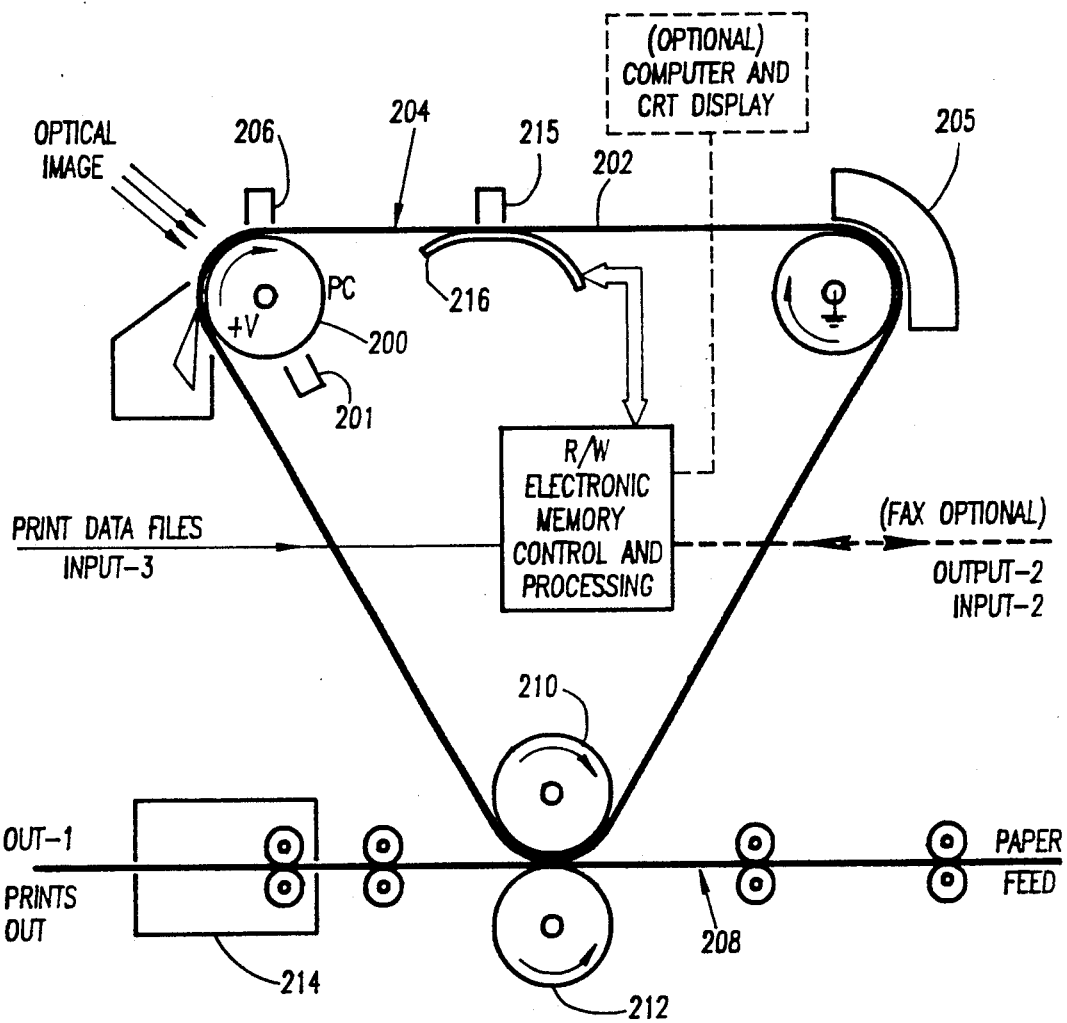
FIGS. 17–18 and 19A–19C are illustrations of the operation and structure of apparatus constructed and operative in accordance with a preferred embodiment of the present invention.
Figure 18:
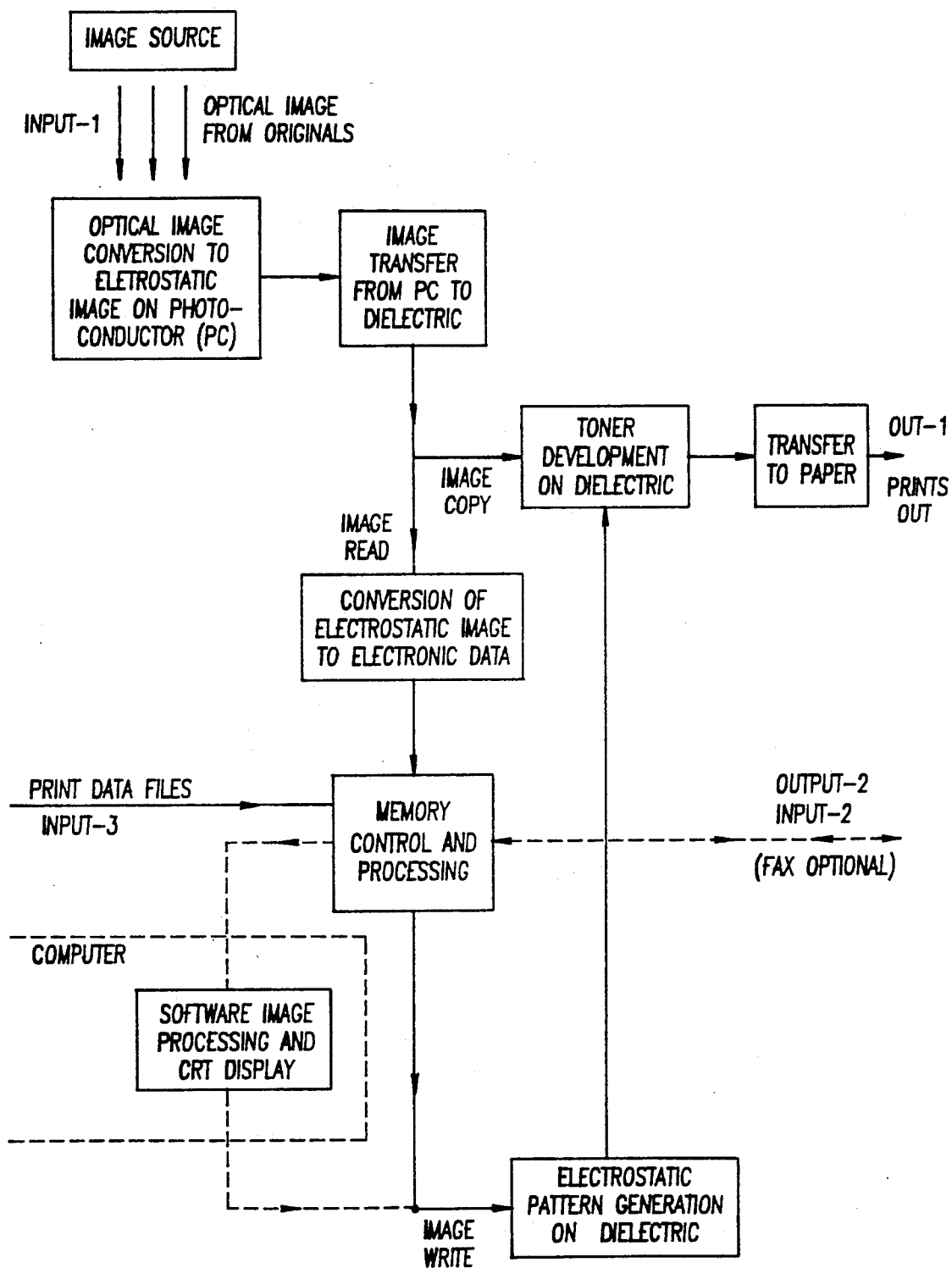

Reference is now made to FIGS. 17, 18 and 19 which illustrate the operation and structure of a universal read/write system constructed and operative in accordance with a preferred embodiment of the present invention.

The illustrated embodiment employs a web of dielectric material, it being appreciated that any other suitable configuration of the dielectric material, such as, for example, a drum configuration, may be employed alternatively. The dielectric material may also have the properties of a photoconductor in certain operative configurations and under certain operative conditions.

An optical image is exposed onto a photoconductor 200 which is precharged, preferably by an AC corona 201. As a result of the exposure, exposed areas of the photoconductor 200 are selectively discharged thus creating on the photoconductor 200 an electrostatic image corresponding to the optical image. Preferably the exposure takes place across a transparent dielectric web 202. Alternately, the exposure may be performed directly onto the photoconductor 200.

Using the techniques described hereinbelow in conjunction with FIGS. 19A-19C, the electrostatic image on the photoconductor 200 is replicated on an outer surface 204 of the dielectric substrate 202, using an AC corona 206 in accordance with a preferred embodiment of the present invention.

The replicated electrostatic image on surface 204 can be developed using standard development equipment 205 to create a toner image on surface 204. This arrangement offers the advantage of development directly on a dielectric substrate.

Subsequently, the toner image can be transferred from surface 204 of dielectric substrate 202 and fused onto paper 208 or onto any other suitable substrate using standard toner transfer techniques, transfer rollers 210 and 212 and fusing unit 214.

Alternately or additionally, the replicated electrostatic image can be read from the dielectric substrate 202 and converted to a digital image using an APCS 215 and a conductive backing 216 in accordance with the techniques described hereinabove in connection with FIGS. 16A and 16B. The digital image can be readily stored, processed, scaled or subjected to any manipulations that are typically carried out on digital images.

Furthermore the digital image may be processed or displayed by any external device, typically including a CRT. Following processing, the digital image can be written as an electrostatic image on the dielectric substrate 202 using APCS 215 and conductive backing 216 in conjunction with the write techniques described in FIGS. 16A-16B and may then be developed and output in the same fashion as described above.

It is appreciated that where the dielectric substrate 202 is a photoconductor, replication of the image thereon from another photoconductor, such as photoconductor 200, may be obviated.

Additionally in accordance with an embodiment of the invention, digital data, such as image data, may be input to the system directly, typically from a facsimile machine, printer or plotter or from any suitable data files and can be output or processed according to the techniques described herein. Furthermore, outputs from the system can be sent directly to a facsimile machine, obviating the step of printing the toner image on paper.

It is appreciated that when a replicated image is read using APCS 215 and conductive backing 216, that image is effectively erased from the surface 204 of dielectric substrate 202. FIG. 18 summarizes the operation of the apparatus of FIG. 17.

Figure 19A:
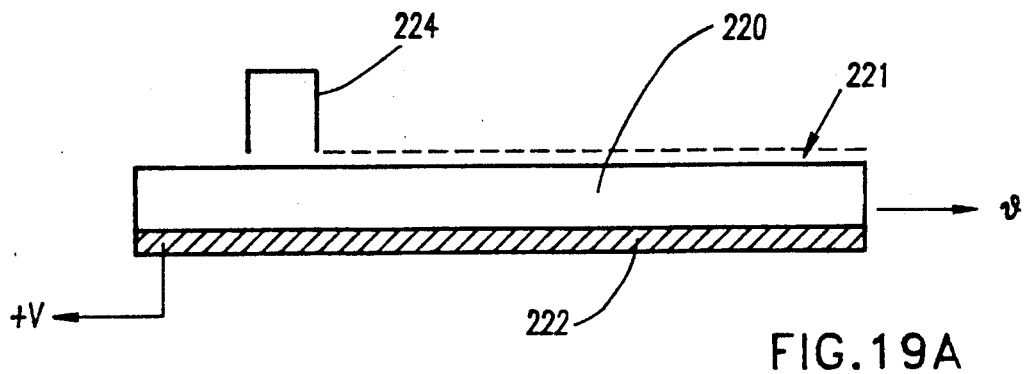
Figure 19B:
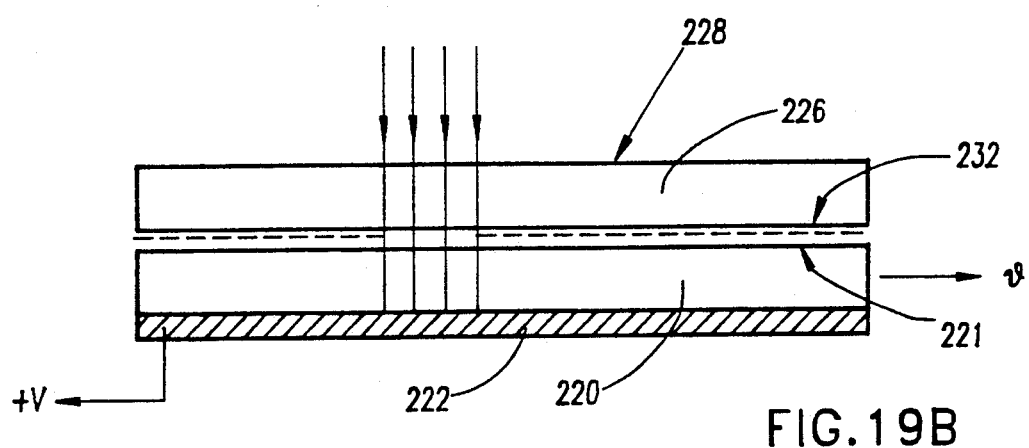
Figure 19C:
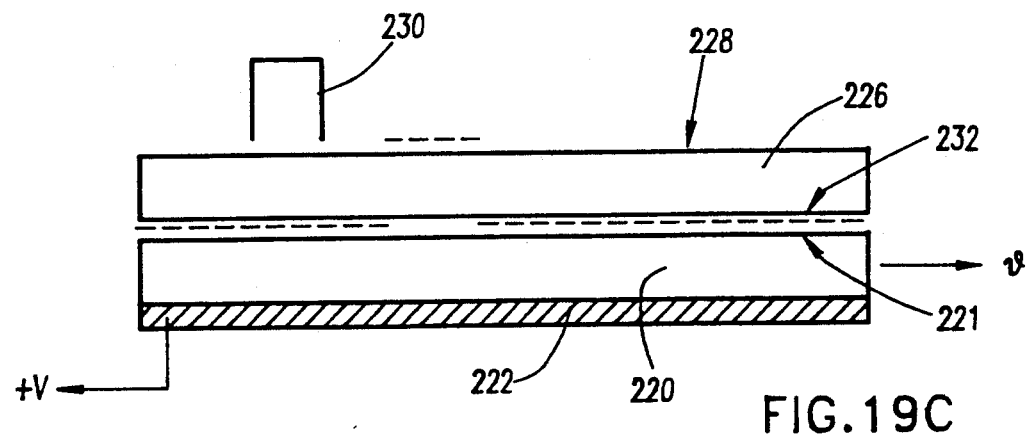

Particular reference is now made to FIGS. 19A-19C which further illustrate the operation of the embodiment illustrated in FIGS. 17 and 18.

FIG. 19A illustrates a photoconductor 220, which may serve as photoconductor 200 in the embodiment of FIG. 17, and an associated conductive backing 222 which is biased to an appropriate voltage +V.

An AC corona 224, which may serve as corona 201 in the embodiment of FIG. 17, creates a uniform charge distribution on surface 221 of the photoconductor 220 using writing techniques described hereinabove in association with FIG. 3. The charge distribution negatively corresponds to the uniform bias voltage present at the conductive backing 222.

FIG. 19B illustrates the optical exposure of an image onto the charged surface 221 of photoconductor 220 across a transparent dielectric substrate 226 which may serve as substrate 202 in the embodiment of FIG. 17. Exposed areas of the uniform charge distribution present on surface 221 are selectively discharged, thereby creating a charge pattern corresponding to the image.

FIG. 19C illustrates the negative replication onto surface 228 of the dielectric substrate 226 of the charge pattern on surface 221 using an AC corona 230, which may serve as AC corona 206 of FIG. 17. The replication is carried out using a variation of the writing technique described hereinabove in conjunction with FIG. 2, wherein the imagewise charged photoconductor 220 and its associated backing 222 replace the conductive backing 14 in the embodiment of FIG. 2.

According to this technique, the voltage at the conductive backing 14 of the embodiment of FIG. 2 is replaced by the combined effective potential of the charge pattern on surface 221 and of the conductive backing 222 having a bias voltage of +V. In those regions that were not discharged by the optical exposure no charges are deposited on the surface 228 since the net potential on surface 232 of the dielectric substrate 226 is effectively zero in those regions.

Accordingly, in those regions that were discharged by the optical exposure, charges are deposited on surface 228, since the net potential on surface 232 of the dielectric substrate 226 equals the bias voltage +V of the conductive backing 222, with allowance being made for residual charges remaining on the photoconductor following the exposure.

Reference is now made to FIGS. 20A-20C which illustrate the operation and structure of an imaging system constructed and operated in accordance with a preferred embodiment of the present invention. The imaging system of FIGS. 20A-20C may constitute any suitable imaging system such as a camera or scanner.

The illustrated embodiment preferably comprises an EAPCS 238 of the type above described in conjunction with FIG. 14A and further preferably comprises a multi-layered drum 240 having an external photoconductive layer 242, which operates as a dielectric, and an innermost supporting substrate 244. Disposed intermediate the photoconductive layer 242 and the support substrate 244 is a layer 246 incorporating a plurality of conductive bands 248.

Preferably the supporting substrate 244 is a dielectric substrate. In an alternative embodiment where the supporting substrate 244 is a metal, a dielectric layer 250 is required between layer 246 and substrate 244 to electrically insulate the conductive bands 248 from metal substrate 244.

The conductive bands 248 are preferably continuously biased to a voltage +V which corresponds to voltage $V_{set}$ of FIGS. 8A-8B. Preferably associated with conductive bands 248 is an electronic reader circuit 252 schematically represented in FIG. 20C. The reader circuit 252 preferably comprises a plurality of accumulators 254 which correspond to accumulators 162 of FIG. 14A, a multiplexer 256 which corresponds to multiplexer 158 of FIG. 14A and read electronics 258 which correspond to read electronics 159 of FIG. 14A.

A standard optical imaging system 259 is employed to project an image on a region 260 of the photoconductor 242, which has preferably been precharged. As a result of the image projection an electrostatic pattern corresponding to the image is created on the corresponding portion 260 of an outer surface 261 of photoconductor 242.

In accordance with the present invention, the electrostatic pattern is read by applying a flow of charges to the pattern bearing region of surface 261 of the dielectric photoconductor 242, using EAPCS 238, thereby inducing a current flow representing the pattern in accordance with the read techniques above described in conjunction with FIGS. 14A and 14B. The current flow is sensed by electronic read circuit 252.

Following reading of the pattern, the surface 261 of the photoconductive layer 242 is effectively erased and simultaneously uniformly charged, thus providing precharging of the photoconductor prior to imaging by imaging system 259.

It is appreciated that electrostatic image generation on a portion of the surface 261 of the photoconductor 242 and reading of an electrostatic pattern from a different portion of the surface 261 of the photoconductor 242 in accordance with the present invention can occur simultaneously.

It is noted that the apparatus of FIGS. 20A-20C is illustrated schematically and that the invention may be embodied in any suitable type of configuration, not limited to the use of drums, conductive bands and EAPCSS.

It will be appreciated by persons skilled in the art that the present invention is not limited to what has been particularly shown and described hereinabove. Rather the scope of the present invention is defined only by the claims which follow:

I claim:

1. Apparatus for information transfer comprising:
a dielectric element having a first surface and a second surface which are generally opposite, a non-visible information bearing voltage signal initially being associated with said first surface or an information bearing charge pattern initially being associated with said second surface; and
generally non-imagewise source means for applying a non-visible flow of charges only to said second surface, said flow of charges being operative to transfer information between said first surface and second surface from said voltage signal to a charge pattern or from said charge pattern to a voltage signal.

2. Apparatus according to claim 1 and wherein said information bearing voltage signal does not exist simultaneously in time with said information bearing charge pattern, representing the same information.

3. Apparatus according to claim 1 and wherein said means for applying a flow of charges is operative to convert a voltage pattern at said first surface to a corresponding electrostatic charge pattern on said second surface, thereby providing an image writing function.

4. Apparatus according to claim 1 and wherein said means for applying a flow of charges is operative to convert a charge pattern on said second surface to a corresponding voltage pattern at the first surface, thereby providing an pattern reading function.

5. Apparatus according to claim 3 and also comprising means for developing said electrostatic charge pattern and transferring said developed pattern to a permanent medium, thereby providing a printing function.

6. Apparatus according to claim 4 and also comprising means for displaying an electronic image corresponding to said voltage signal, thereby providing a charge pattern read information output function.

7. Apparatus according to claim 3 and wherein said means for applying a flow of charges is also operative to convert a charge pattern on said second surface to a corresponding voltage signal at the first surface, thereby providing an image reading function.

8. Apparatus according to claim 3 and wherein said dielectric element is operative for storing said charge pattern.

9. Apparatus according to claim 1 and wherein said dielectric element is a photoconductor.

10. Apparatus according to claim 4 and wherein said dielectric element is a photoconductor which is operative to provide said charge pattern on said second surface in response to an optical input thereto.

11. Apparatus according to claim 3 and also comprising:
means for imagewise application of voltage to a first surface of the dielectric substrate.

12. A method for information transfer and including the steps of:
providing a dielectric element having a first surface and a second surface which are generally opposite and having either an information bearing voltage signal associated with said first surface or an information bearing charge pattern associated with said second surface; and
applying a generally non-imagewise, non-visible flow of charges only to said second surface, said flow of charges being operative to transfer information between said first and second surfaces, from said voltage signal to a charge pattern or from said charge pattern to a voltage signal.

13. A method according to claim 12 and wherein said step of applying a flow of charges is operative to convert a voltage signal at said first surface to a corresponding electrostatic charge pattern on said second surface, thereby providing an image writing function.

14. A method according to claim 12 and wherein said step of applying a flow of charges is operative to convert a charge pattern on said second surface to a corresponding voltage signal at the first surface, thereby providing an image reading function.

15. A method according to claim 13 and also comprising the steps of developing said electrostatic charge pattern and the step of transferring said developed pattern to a permanent medium, thereby providing a printing function.

16. A method according to claim 14 and also comprising the step of displaying said voltage pattern, thereby providing a read information output function.

17. A method according to claim 13 and wherein said step of applying a flow of charges is also operative to convert a charge pattern on said second surface to a corresponding voltage pattern at the first surface, thereby providing an image reading function.

18. A method according to claim 13 and wherein said dielectric element is operative for storing said charge pattern.

19. A method according to claim 12 and wherein said dielectric element is a photoconductor.

20. A method according to claim 14 and wherein said dielectric element operates as a photoconductor to provide said charge pattern on said second surface in response to an optical input thereto.

21. A method according to claim 13 and also comprising:
the step of imagewise application of voltage to a first surface of the dielectric substrate.

22. Apparatus for reading an electrostatic charge pattern comprising:
a dielectric substrate having first surface and second opposite surface;
a conductive backing operatively associated with said first surface;
an information bearing charge pattern associated with said second surface;
generally non-imagewise source means for applying a non-visible flow of charges to said second surface thereby converting said information bearing charge pattern to a corresponding electrical voltage signal in said conductive backing; and
means coupled to said conductive backing for sensing said electrical voltage signal and providing an electrical output representing said pattern.

23. Apparatus according to claim 22 and wherein said means coupled to said conductive backing comprises:
capacitive means for receiving said electrical signal;
means coupled to said capacitive means for providing spatial pattern information corresponding to said electrical signal.

24. Apparatus according to claim 23 and wherein said means for providing spatial pattern information comprises means for sensing the voltage on said capacitor in a time domain which corresponds to a spatial domain in which the pattern is defined.

25. Apparatus according to claim 24 and wherein said means, for sensing the voltage comprises sample and hold means.

26. Apparatus according to claim 1 and wherein the flow of charges which is applied to the second surface of the dielectric substrate contains charges of both positive and negative polarities.

27. Apparatus according to claim 3 and wherein the flow of charges which is applied to the second surface of the dielectric substrate contains charges of both positive and negative polarities.

28. Apparatus according to claim 4 and wherein the flow of charges which is applied to the second surface of the dielectric substrate contains charges of both positive and negative polarities.

29. A method for reading an electrostatic charge pattern including the steps of:
providing a dielectric substrate having first surface and second opposite surface;
operatvely associating a conductive backing with said first surface;
associating an information bearing charge pattern with said second surface;
applying, in a generally non-imagewise manner, a non-visible flow of charges to said second surface thereby converting said information bearing charge pattern to a corresponding electrical voltage signal in said conductive backing; and
sensing said electrical voltage signal and providing an electrical output representing said pattern.

30. A method according to claim 29 and wherein said step of sensing includes the steps of:
capacitively accumulating said electrical signal;
providing spatial pattern information corresponding to said electrical signal.

31. A method according to the method of claims 30 and including the step of sensing the voltage corresponding to said accumulated electrical signal in a time domain which corresponds to a spatial domain in which the pattern is defined.

32. A method according to claim 31 and wherein the step of sensing the voltage includes the step of sensing the voltage using sample and hold means.

33. Apparatus according to claim 22 and wherein the flow of charges which is applied to the second surface of the dielectric substrate contains charges of both positive and negative polarities.

34. Apparatus according to claim 33 and wherein the flow of charges alternates in time between positive and negative charges.

35. A method according to claim 29 and wherein the flow of charges which is applied to the second surface of the dielectric substrate contains charges of both positive and negative polarities.

36. Apparatus according to claim 22 and wherein application of said charges to the second surface is operative to generate at the first surface a voltage pattern in accordance with the charge pattern on the second surface.

* * * * *

UNITED STATES PATENT AND TRADEMARK OFFICE
CERTIFICATE OF CORRECTION

PATENT NO. : 5,289,214

DATED : Feb. 22, 1994

INVENTOR(S) : Albert Zur

It is certified that error appears in the above-identified patent and that said Letters Patent is hereby corrected as shown below:

On the title page, item [54], Title should read

"Apparatus For Information Transfer Including A Dielectric Element and Generally Non-Imagewise Charge Source"

Signed and Sealed this

Sixth Day of September, 1994

Attest:

BRUCE LEHMAN

*Attesting Officer*     *Commissioner of Patents and Trademarks*